United States Patent
Bauer et al.

(10) Patent No.: US 6,632,561 B1
(45) Date of Patent: Oct. 14, 2003

(54) COMPOSITES BODIES USED AS SEPARATORS IN ELECTROCHEMICAL CELLS

(75) Inventors: Stephan Bauer, Hochdorf-Assenheim (DE); Bernd Bronstert, Otterstadt (DE); Helmut Möhwald, Annweiler (DE); Rainer Blum, Ludwigshafen (DE); Gerhard Dötter, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/830,265

(22) PCT Filed: Nov. 2, 1999

(86) PCT No.: PCT/EP99/08369

§ 371 (c)(1), (2), (4) Date: Apr. 25, 2001

(87) PCT Pub. No.: WO00/26977

PCT Pub. Date: May 11, 2000

(30) Foreign Application Priority Data

Nov. 4, 1998 (DE) ......................................... 198 50 826

(51) Int. Cl.[7] .................................................. H01M 2/16
(52) U.S. Cl. ...................... 429/144; 429/129; 429/304; 429/306; 429/309; 429/247; 429/249; 428/304.4; 428/320.2; 428/322.2; 428/327; 428/411.1; 428/423.7; 428/424.6; 428/424.7; 428/424.8; 428/473.5; 428/474.4; 204/296; 521/27; 252/62.2
(58) Field of Search ................... 429/129, 304, 429/306, 309, 247, 249, 144; 252/62.2; 428/304.4, 320.2, 322.2, 322.7, 327, 411.1, 423.7, 424.6, 424.7, 424.8, 473.5, 474.4; 204/296; 521/27

(56) References Cited

U.S. PATENT DOCUMENTS

| | | | | |
|---|---|---|---|---|
| 6,225,399 B1 | * | 5/2001 | Araki et al. | ............. 524/544 |
| 6,416,905 B1 | * | 7/2002 | Bronstert et al. | ............ 429/304 |
| 6,475,663 B1 | * | 11/2002 | Mohwald et al. | ........... 429/129 |
| 6,479,578 B2 | * | 11/2002 | Araki et al. | ............. 524/517 |
| 6,511,774 B1 | * | 1/2003 | Tsukuda et al. | ............ 429/247 |

FOREIGN PATENT DOCUMENTS

| | | |
|---|---|---|
| DE | 196 12 769 | 10/1997 |
| EP | 715 364 | 6/1996 |
| EP | 718 901 | 6/1996 |
| GB | 2 027 637 | 2/1980 |
| WO | WO 97/37395 | 10/1997 |

OTHER PUBLICATIONS

Ullmann's Encyclopedia of Industrial Chemistry, Fifth Ed., vol. A3 pp. 343–397, No month/year available.

* cited by examiner

Primary Examiner—Bruce F. Bell
(74) Attorney, Agent, or Firm—Keil & Weinkauf

(57) ABSTRACT

A composite comprises at least one layer which includes a composite comprising (a) from 1 to 99% by weight of a solid (I) with a primary particle size of from 5 nm to 100 μm or a mixture made from at least two solids, (b) from 99 to 1% by weight of a polymeric binder (II) which includes:

(IIa) from 1 to 100% by weight of a polymer or copolymer (IIa) which has, along the chain, terminally and/or laterally, reactive groups (RG) which are capable of crosslinking reactions when exposed to heat and/or UV radiation, and (IIb) from 0 to 99% by weight of at least one polymer or copolymer (IIb) which is free from reactive groups RG, where the at least one layer has been applied to at least one second layer comprising at least one conventional separator.

20 Claims, 5 Drawing Sheets

COMPOSITES BODIES USED AS SEPARATORS IN ELECTROCHEMICAL CELLS

The present invention relates to composites which are suitable in particular as separators for electrochemical cells, preferably rechargeable cells and in particular lithium batteries and lithium ion batteries, to these separators and, respectively, electrochemical cells per se, and also to a process for producing these composites.

BACKGROUND OF THE INVENTION

Electrochemical cells, in particular those which are rechargeable, are well known, for example from Ullmann's Encyclopedia of Industrial Chemistry, $5^{th}$ ed., Vol. A3, VCH Verlagsgesellschaft mbH, Weinheim 1985, pages 343–397.

Due to their high specific energy storage density, lithium batteries and lithium ion batteries occupy a particular position among these cells, especially as secondary cells. As described, inter alia, in the above extract from "Ullmann", such cells contain lithiated compound oxides of manganese, cobalt, vanadium or nickel. These may be described in the stoichiometrically simplest case as $LiMn_2O_4$, $LiCoO_2$, $LiV_2O_5$ or $LiNiO_2$.

These compound oxides react reversibly with substances, such as graphite, which are capable of incorporating lithium ions into their lattice, the lithium ions being removed from the crystal lattice and the metal ions within this, such as manganese, cobalt or nickel ions, being oxidized. In an electrochemical cell this reaction can be used to store electrical energy by separating the compound accepting lithium ions, i.e. the anode material, from the lithium-containing compound oxide, i.e. the cathode material, by means of an electrolyte through which the lithium ions forming the compound oxide can migrate into the anode material (charging).

The compounds suitable for reversible storage of lithium ions are usually secured to collector electrodes by means of a binder.

During charging of the cell, electrons flow through an external voltage source and lithium cations through the electrolyte toward the anode material. When the cell is used, the lithium cations flow through the electrolyte, whereas the electrons flow from the anode material to the cathode material through a load.

In order to avoid a short circuit within the electrochemical cell, a layer which is electrically insulating but permeable to lithium cations is located between the two electrodes. This may be a so-called solid electrolyte or a conventional separator.

As is well known solid electrolytes and separators are composed of a carrier material, incorporated into which are a dissociable compound which contains lithium cations and serves to increase lithium ion conductivity and also usually other additives, such as solvents.

Microporous films have for some time been proposed as separators. For example, GB 2 027 637 describes a microporous film which comprises a matrix with from 40 to 90% by volume of a polyolefin and from 10 to 60% by volume of an inorganic filler and other constituents as respectively defined therein. The matrix described therein has 30 to 95% by volume of cavities, based on the volume of the film, and is a separator for lead accumulators.

EP-B 0 715 364 describes a two-layer battery separator with shutdown characteristics. The battery separator described there has a first microporous membrane which has a shutdown function and has been produced from a material selected from the class consisting of polyethylene, a blend comprising essentially polyethylene and of a copolymer of polyethylene. The separator also has a second microporous membrane which has a strengthening function and has been produced from a material selected from the class consisting of polypropylene, of a blend which comprises essentially polypropylene and a copolymer of polypropylene. According to the description, this separator has better mechanical strength and transit energy than the prior art.

EP-A 0 718 901 describes a three-layer battery separator with shutdown characteristics. This separator comprises a first and third microporous polypropylene membrane which in turn includes a microporous polyethylene membrane, where the first and third membrane has a greater puncture resistance and a higher melting point than the second membrane.

EP-A-0 708 791 describes a composite polymer electrolyte in membrane form which has an ion-conducting polymer gel applied to a matrix material made from a porous polytetrafluoroethylene membrane.

SUMMARY OF THE INVENTION

It is an object of the present invention, taking into account this prior art, to provide a separator which likewise has a shutdown mechanism and, furthermore, has dimensional stability at high temperature (>150° C.) and further improved mechanical strength, and, furthermore, has excellent ion-conducting properties.

We have found that this object is achieved by means of a composite comprising at least a first layer which comprises a composition comprising
 (a) from 1 to 99% by weight of a solid (I) with a primary particle size of from 5 nm to 100 μm or a mixture made from at least two solids,
 (b) from 99 to 1% by weight of a polymeric binder (II) which comprises:
  (IIa) from 1 to 100% by weight of a polymer or copolymer (IIa) which has, along the chain, terminally and/or laterally, reactive groups (RG) which are capable of crosslinking reactions when exposed to heat and/or UV radiation, and
  (IIb) from 0 to 99% by weight of at least one polymer or copolymer (IIb) which is free from reactive groups RG,
where the at least one first layer has been applied to at least one second layer comprising at least one conventional separator.

The composition present in the at least one first layer, and the preparation of the same, is now described in more detail below.

The solid I is preferably selected from the class consisting of an inorganic solid, preferably a basic inorganic solid, selected from the class consisting of oxides, mixed oxides, carbonates, silicates, sulfates, phosphates, amides, imides, nitrides and carbides of elements of the $1^{st}$, $2^{nd}$, $3^{rd}$ or $4^{th}$ principal group, of the $4^{th}$ transition group, or the periodic table; a polymer selected from the class consisting of polyethylene, polypropylene, polystyrene, polytetrafluoroethylene and polyvinylidene fluoride; polyamides, polyimides; a solid dispersion comprising a polymer of this type; glass powder, nanoglass particles, e.g. Monosper® (Merck), microglass particles, e.g. Spheriglas® (Potters-Ballotini), nanowhiskers and a mixture of two or more of these, where the composition obtained can be used as a solid electrolyte and/or separator.

Mention should be made in particular, by way of example, of: oxides, e.g. silicon dioxide, aluminum oxide, magnesium oxide or titanium dioxide, compound oxides, for example of the elements silicon, calcium, aluminum, magnesium, titanium; silicates, e.g. ladder-type silicates, ino-, phyllo- and tectosilicates, e.g. talc, pyrophyllite, muskovite, phlogophite, amphiboles, nesosilicates, pyroxenes, sorosilicates, zeolites, feldspars, wollastonite, in particular hydrophobicized wollastonite, mica, phyllosilicates; sulfates, e.g. alkali metal sulfates and alkaline earth metal sulfates; carbonates, such as alkali metal carbonates and alkaline earth metal carbonates, e.g. calcium, magnesium or barium carbonate or lithium, potassium or sodium carbonate; phosphates, such as apatites; amides; imides; nitrides; carbides; polymers, e.g. polyethylene, polypropylene, polystyrene, polytetra-fluoroethylene, polyvinylidene fluoride, polyamides, polyimides, or other thermoplastics, thermosets or microgels, crosslinked polymer particles, e.g. Agfaperl®, solid dispersions, in particular those which comprise the abovementioned polymers, also mixtures of two or more of the abovementioned solids.

The solid I used may according to the invention also comprise inorganic Li-ion-conducting solids, preferably a basic inorganic Li-ion-conducting solid.

Those which should be mentioned are: lithium borates, e.g. $Li_4B_6O_{11}*xH_2O$, $Li_3(BO_2)_3$, $Li_2B_4O_7*xH_2O$, $LiBO_2$, where the number x may be from 0 to 20; lithium aluminates, e.g. $Li_2O*Al_2O_3*H_2O$, $Li_2Al_2O_4$, $LiAlO_2$; lithium aluminosilicates, e.g. lithium-containing zeolites, feldspars, feldspar substitutes, phyllo- and inosilicates, and in particular $LiAlSi_2O_6$ (spodumene), $LiAlSi_4O_{10}$ (petullite), $LiAlSiO_4$ (eucryptite), micas, e.g. $K[Li,Al]_3[AlSi]_4O_{10}(F-OH)_2$, $K[Li,Al,Fe]_3[AlSi]_4O_{10}(F-OH)_2$; lithium zeolites, in particular those in fiber, sheet or cube form, and in particular those with the general formula $Li_{2/z}O*Al_2O_3*xSiO_2*yH_2O$ where z is the valency, x is from 1.8 to about 12 and y is from 0 to about 8; lithium carbides, e.g. $Li_2C_2$, $Li_4C$; $Li_3N$; lithium oxides and compound lithium oxides, e.g. $LiAlO_2$, $Li_2MnO_3$, $Li_2O$, $Li_2O_2$, $Li_2MnO_4$, $Li_2TiO_3$; $Li_2NH$; $LiNH_2$; lithium phosphates, e.g. $Li_3PO_4$, $LiPO_3$, $LiAlFPO_4$, $LiAl(OH)PO_4$, $LiFePO_4$, $LiMnPO_4$; $Li_2CO_3$; lithium silicates in the form of ladder-type silicantes, ino-, phyllo- and tectasilicates, e.g. $Li_2SiO_3$, $Li_2SiO_4$ and $Li_6Si_2$; lithium sulfates, e.g. $Li_2SO_4$, $LiHSO_4$, $LiKSO_4$; and also the Li compounds mentioned as compound Ib, where the presence of conductivity black is excluded when these are used as solid I; and also mixtures of two or more of the abovementioned Li-ion-conducting solids.

Preferred solids I are hydrophobicized solids I, more preferably hydrophobicized compounds of the abovementioned type.

Basic solids are particularly suitable here. For the purposes of the invention, basic solids are those whose mixture with a liquid, water-containing diluent which itself has a pH of not more than 7 has a higher pH than this diluent.

The solids should advantageously be very substantially insoluble in the liquid used as electrolyte, and also be electrochemically inert in the battery medium. Suitable solids I are those which have a primary particle size of from 5 nm to 20 µm, preferably from 0.01 to 10 µm and in particular from 0.1 to 5 µm, the particle sizes given being determined by electron microscopy. The melting point of the pigments is preferably above the usual operating temperature of the electrochemical cell, and melting points of above 120° C., in particular above 150° C., have proven particularly advantageous.

The pigments here may be symmetrical in their external shape, i.e. have a dimensional ratio of height to width to length (aspect ratio) of about 1 and be shaped as spheres or pellets, be approximately round in shape, or else be in the shape of any desired polyhedron, such as a cuboid, tetrahedron, hexahedron, octahedron or bipyramid, or may be distorted or asymmetric, i.e. have a dimensional ratio of height to width to length (aspect ratio) which is not equal to 1 and be, for example, in the form of needles, asymmetrical tetrahedra, asymmetrical bipyramids, asymmetrical hexa- or octahedra, lamellae or plates, or of fiber-like shape. If the solids are asymmetric particles, the upper limit given above for the primary particle size refers to the smallest axis in each case.

The composition used according to the invention comprises from 1 to 95% by weight, preferably from 15 to 90% by weight, more preferably from 25 to 85% by weight, in particular from 50 to 80% by weight, of a solid I, and from 5 to 99% by weight, preferably from 10 to 85% by weight, more preferably from 15 to 75% by weight, in particular from 20 to 50% by weight, of the polymeric binder II.

This polymeric binder II comprises from 1 to 100% by weight of at least one polymer or copolymer Ia which has, along the chain, terminally and/or laterally, reactive groups (RG) which are capable of crosslinking reactions when exposed to heat and/or UV radiation, and from 0 to 99% by weight of at least one polymer or copolymer (IIb) which is free from reactive groups RG.

The polymers IIa used may in principle be any polymer crosslinkable on exposure to heat and/or high-energy radiation, preferably UV light, and having, along the chain, terminally and/or laterally, reactive groups (RG), preferably reactive groups RGa or RGb, or RGa and RGb, through which the polymers can crosslink when activated by heat and/or radiation.

The polymer IIa is more preferably a polymer which has, along the chain, terminally and/or laterally, at least one group RGb different from RGa and coreactive with RGa, where on average across all of the polymer molecules there is at least one RGa and at least one group RGb.

The polymer IIa may, furthermore, be formed from a mixture of two or more polymers of which a portion has only RGa and another portion has only RGb.

The polymer IIa may, furthermore, be formed from a mixture of two or more polymers of which a portion has only RGa and another portion has only RGb and of other polymers which have both RGA and RGb.

The polymer IIa is generally formed from one coherent class of polymers, preferably from the polyacrylates class. However, blends of various polymer classes are also possible.

The polymer IIa may comprise either polymers or oligomeric substances, or also mixtures of polymers and oligomeric substances.

The oligomeric and/or polymeric fundamental structure of the polymers IIa may comprise known polymers built up, for example, via —C—C— linkages, which may also have double and/or triple bonds, or also via ether, ester, urethane, amide, imide, imidazole, ketone, sulfide, sulfone, acetal, urea, carbonate or siloxane linkages.

The oligomeric or polymeric fundamental structure may also be linear, branched-chain, ring-shaped or of dendrimer type.

The polymers IIa used according to the invention may be obtained by polymerization, polyaddition or polycondensation of monomeric building blocks which, besides the groups through which the polymer is built up, also have RGa and/or RGb, so that according to the invention functionalized polymers IIa are formed straightaway during the preparation of the polymer.

The polymers IIa according to the invention may, furthermore, be obtained by polymer-analogous reaction of functional polymers with compounds which have RGa and/or RGb and at least one other group which can react with the functional groups of the oligomeric or polymeric fundamental structure.

It is also possible for one of the functional groups RGa and/or RGb to be incorporated straightaway during the preparation of the polymer, and then for the other RG to be introduced into the finished polymer by polymer-analogous functionalization. Groups RGa are groups having structures which are capable of hydrogen abstraction when exposed to high-energy radiation, preferably UV radiation, in the triplet excited state (Norrish II-type photoinitiator groups known from the literature). Structures of this type are known to the skilled worker from photochemistry. The literature also lists the appropriate acrylate (derivative) compounds which have structures of this type. Further details concerning these compounds can be found in U.S. Pat. No. 5,558,911, the full scope of the disclosure of which in this connection is incorporated into this application. According to the invention it is, of course, also possible to use other monomers, oligomers or polymers which have structures RGa of this type.

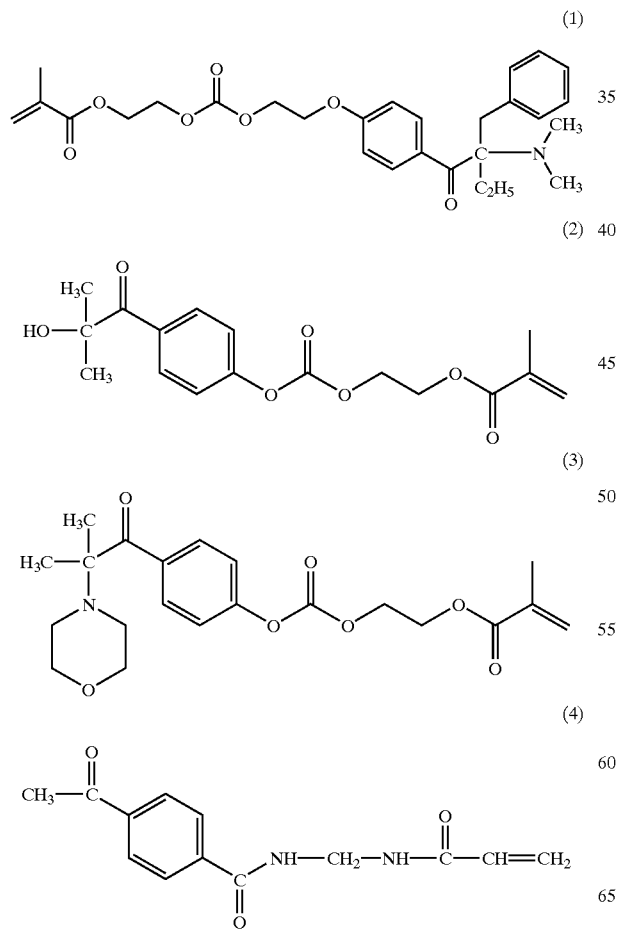

(1)

(2)

(3)

(4)

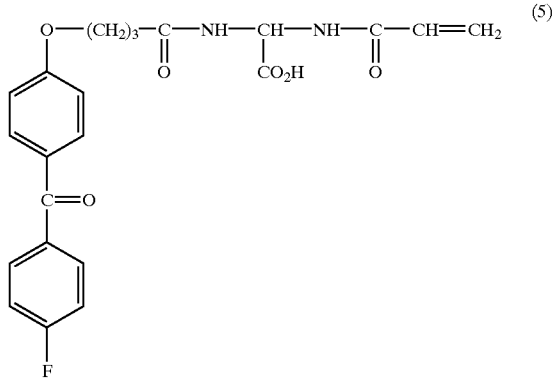

(5)

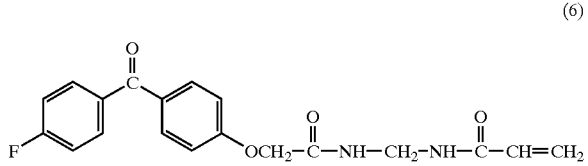

(6)

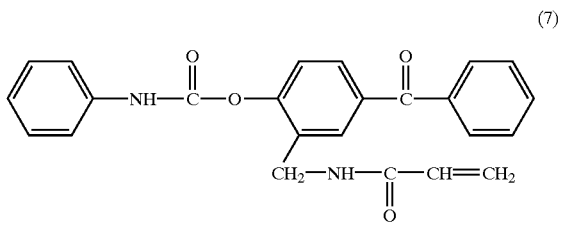

(7)

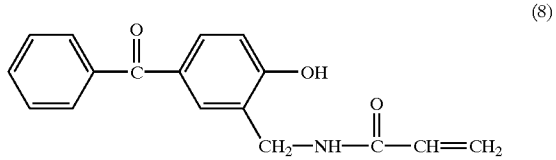

(8)

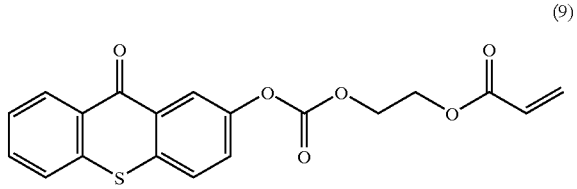

(9)

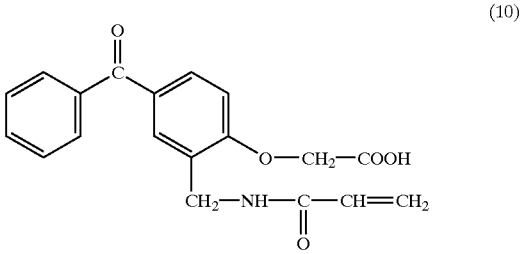

(10)

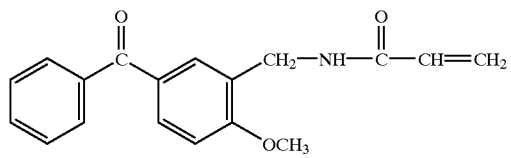
(11)
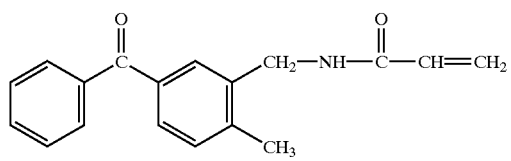
(12)
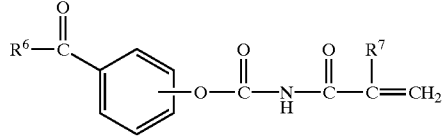
(13)
where
R⁶ is —CH₃ or —C₆H₅
R⁷ is —H or —CH₃
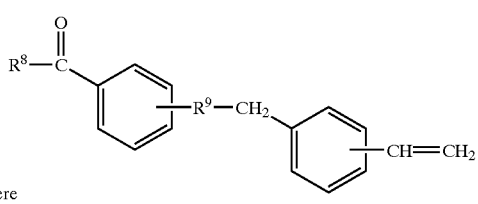
(14)
where
R⁸ is —$C_nC_{2n+1}$, with n = 1 to 3 or $C_6H_5$,
R⁹ is —O—, —$\overset{O}{\underset{\|}{C}}$—O—, —$\overset{R^{10}}{\underset{|}{N}}$— or —$\overset{\oplus}{N}(R^{11})_2$—
R¹⁰ is —H or —$C_nH_{2n-1}$, with n = 1 to 8, and
R¹¹ is —$C_nH_{2n-1}$, with n = 1 to 4
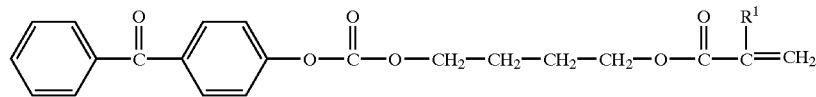
(15)
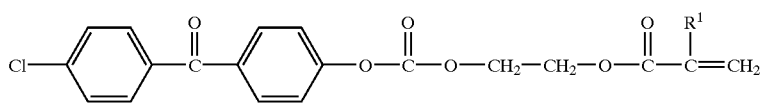
(16)
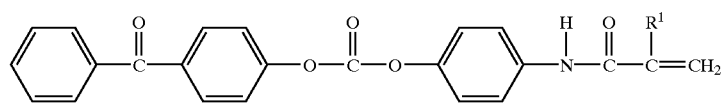
(17)
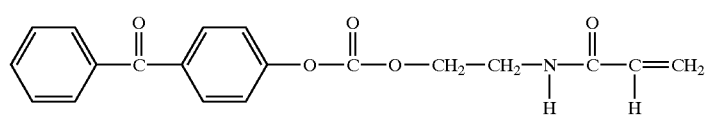
(18)
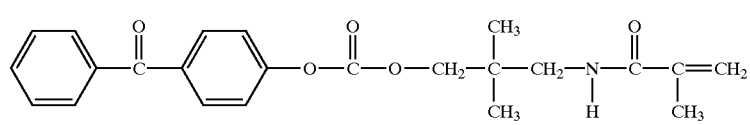
(19)

-continued
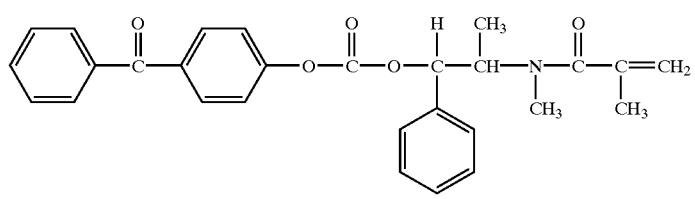
(20)
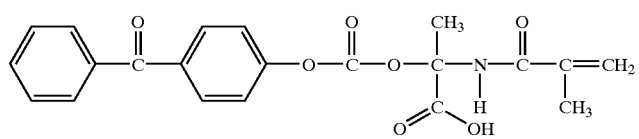
(21)
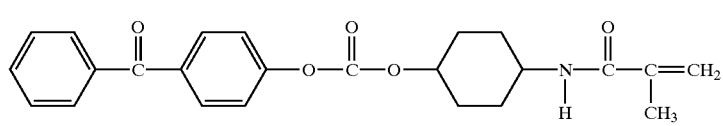
(22)
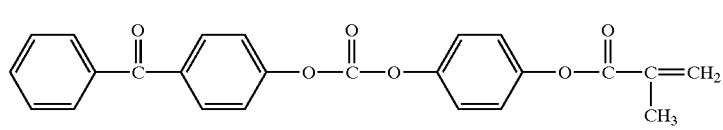
(23)
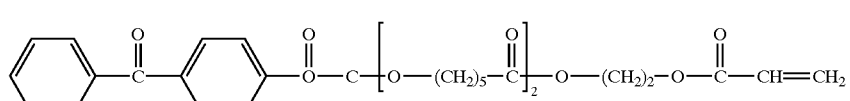
(24)
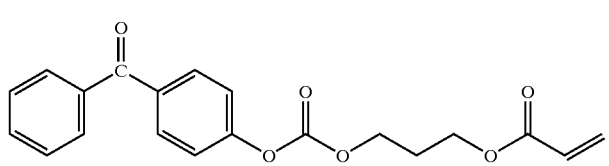
(25)
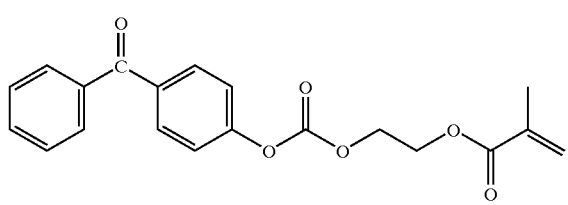
(26)
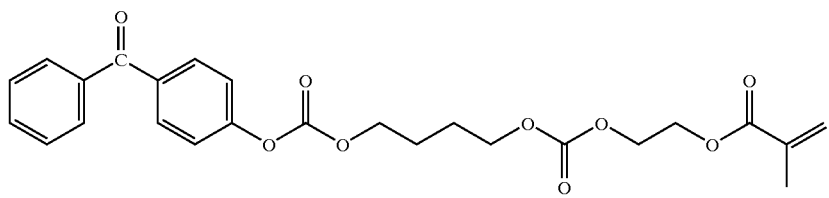
(27)
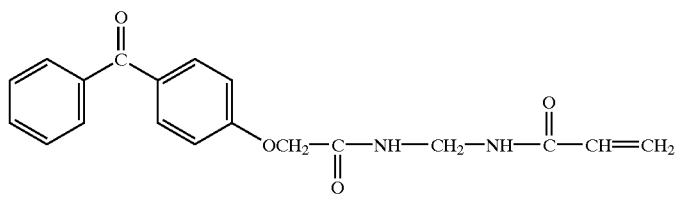
(28)

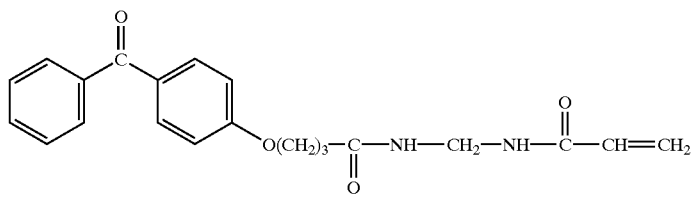
(29)
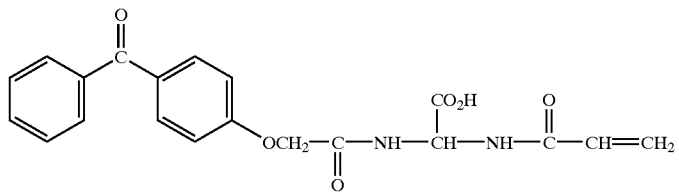
(30)
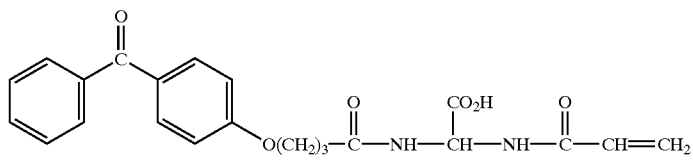
(31)
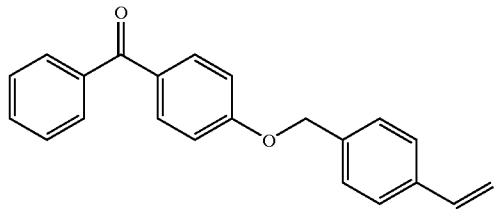
(32)
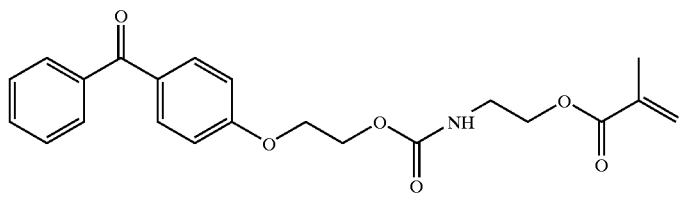
(33)
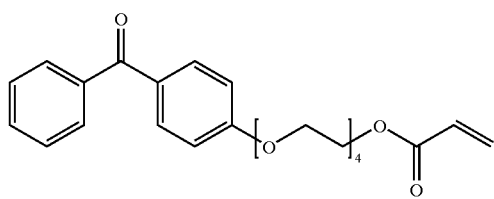
(34)
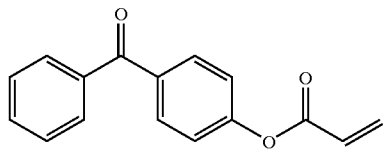
(35)
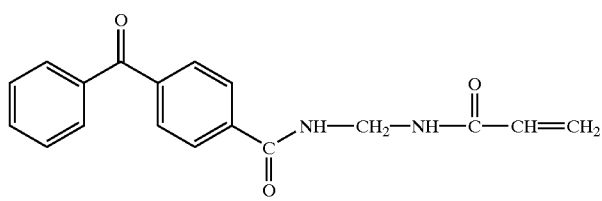
(36)

-continued

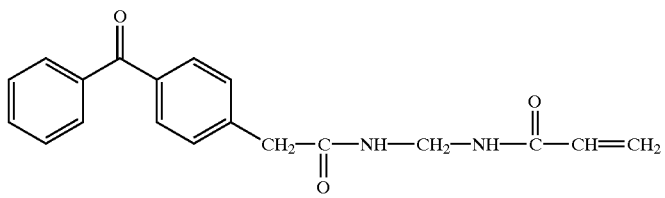
(37)

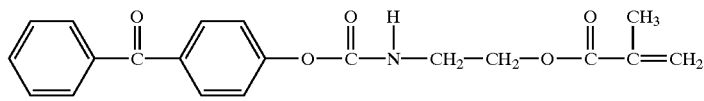
(38)

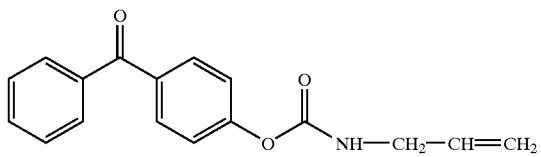
(39)

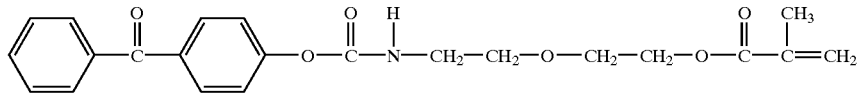
(40)

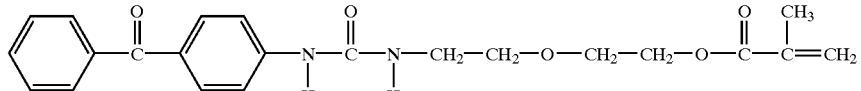
(41)

The concomitant use of RGa acrylates of this type makes it readily possible, for example by copolymerization with other acrylates, to obtain acrylate copolymers functionalized with RGa in a manner according to the invention.

Base polymers having, for example, amino groups but without RGa groups may also readily be functionalized with RGa by Michael addition of RGa acrylates of this type.

Benzophenone groups are preferred as RGa. In the case of polyacrylates, particularly high UV reactivity is achieved with benzophenone derivatives in which the benzophenone group has been bonded to the main polymer chain via a spacer group. Particularly preferred polyacrylates are obtainable by copolymerizing with acrylates of the formulae 24 to 26 and 34.

Another cost-effective and preferred way of introducing RGa into polymers is the reaction of hydroxybenzophenones, preferably 4-hydroxybenzophenone, with the epoxy groups of a polymer, preferably the addition of 4-hydroxybenzophenone to polyacrylates having glycidyl (meth)acrylate content. Another elegant method is the reaction of an adduct made from one mole of diisocyanate and one mole of 4-hydroxybenzophenone with a polymer having free hydroxyl groups.

A preferred method of introducing RGa into polyesters is the concomitant use of benzophenonecarboxylic acids or, respectively, of benzophenonecarboxylic anhydrides during the polycondensation, or the reaction or, respectively, esterification of polymers having hydroxyl groups, epoxy groups, isocyanate groups and/or amino groups with benzophenonecarboxylic acids or, respectively, benzophenonecarboxylic anhydrides.

Groups RGb are groups which can interact with excited Norrish II photoinitiator groups. A particular interaction of this type known to the skilled worker is hydrogen transfer to the Norrish II structure, resulting in formation of free radicals both on the H donor and on the abstracting Norrish II structure. Direct crosslinking of the polymers is possible via free-radical combination. It is also possible for the photochemically produced free radicals to initiate a free-radical-initiated polymerization of, for example, polymerizable functional groups RGb, e.g. maleate, fumarate, (meth)acrylate, allyl, epoxy, alkenyl, cycloalkenyl, vinyl ether, vinyl ester, vinylaryl or cinnamate groups.

Preferred RGb interact as H donors with RGa systems, i.e. are free from double bonds. An advantage inherent in such systems is their low sensitivity to interference since, compared with unsaturated UV systems, they have less reactivity toward the other constituents of the overall mix. This does not, of course, rule out the (concomitant) use of unsaturated substances, and this is a task for optimization in individual cases. H-donor groups are known to the skilled worker in photochemistry. They are in principle groups which have hydrogen having a low bond energy, in particular groups having hydrogen atoms with a bond energy of less than 397 kJ/mol.

Data on bonding energy are known from the literature and can be found, for example, in Morrison, Robert Thornton, Organic Chemistry, Table: Homolytic Bond Dissociation Energies on the inside of the jacket, in Library of Congress Cataloging-in-Publication Data ISBNO-205-08453-2, 1987, by Allyn and Bacon, Inc. A Division of Simon & Schuster, Newton, Mass., USA.

Examples are amine compounds, furfuryl compounds, tetrahydrofurfuryl compounds, isobornyl compounds, isoalkyl compounds and compounds which have groups of the following structures:

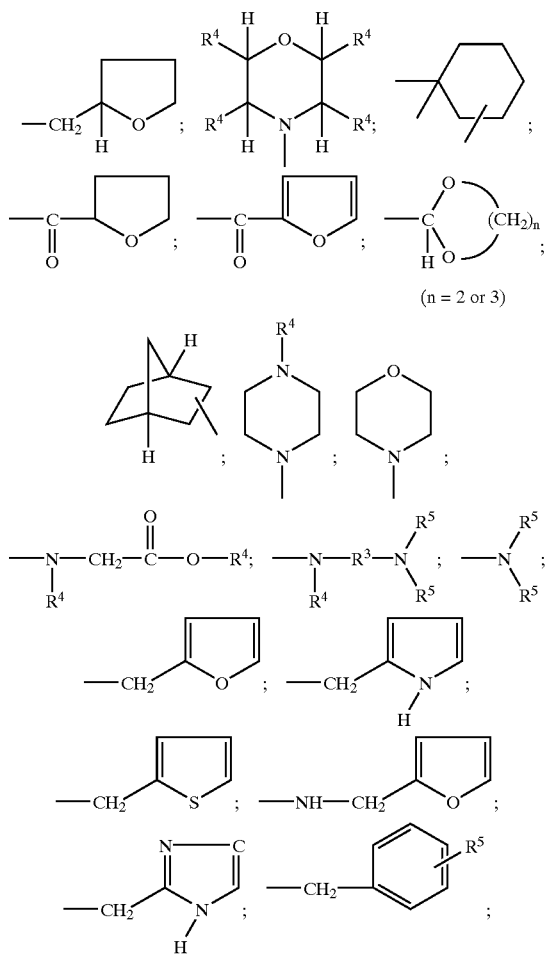

(n = 2 or 3)

where

R³=a bivalent aliphatic, cycloaliphatic, heterocyclic or aromatic radical, unsubstituted or substituted, or a single bond R⁴=H, straight-chain or branched alkyl, for example having from 1 to 8 carbon atoms, halo-substituted aryl or isoamylphenyl R⁵=alkyl, halo-substituted alkyl, halo-substituted aryl or isoamylphenyl. These formulae are non-limiting examples.

Preference is given to those groups in which the easily abstractable H atoms are H atoms in the position α to a double bond (allyl H atoms). Particularly preferred RGb groups are

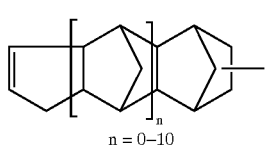

RGb1 n = 0–10

An example of methods for incorporating structures of this type is the concomitant use of esters of (oligo) dihydrodicyclopentadienol.

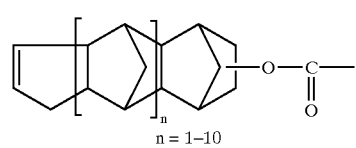

RGb2 n = 1–10

The maleate/fumarate half esters of (oligo) dihydrodicyclopentadienol are readily obtainable industrially from maleic acid and DCPD.

These half esters are obtainable in a smooth reaction from maleic anhydride (MA), water and dicyclopentadiene (DCPD) or, respectively, by direct addition of DCPD to MA. It is also possible to carry out direct addition of DCPD to other acids and/or acid polyesters. However, these reactions mostly proceed less satisfactorily and require catalysis, e.g. with BF₃ etherate.

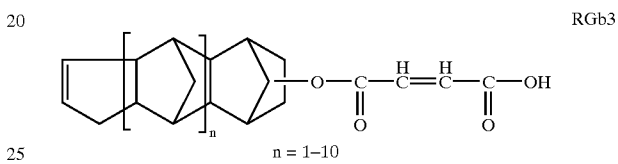

RGb3 n = 1–10

U.S. Pat. No. 252,682 has also disclosed that during the reaction of DCPD and MA side reactions can take place to a subordinate extent as given in the scheme of formulae below. These byproducts also serve to introduce structures as in the formula RGb1.

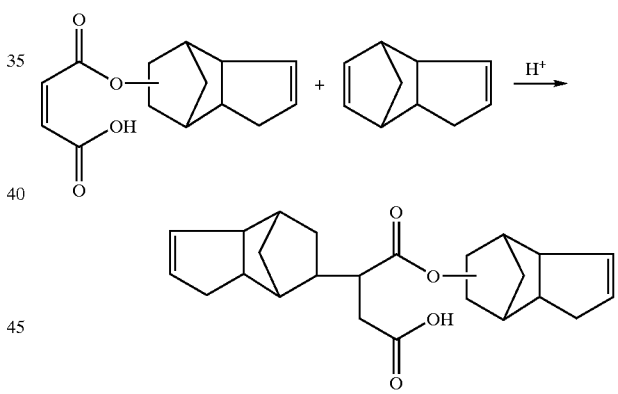

Dihydrodicyclopentadienol and dihydrodicyclopentadienol acrylate are moreover commercially available and suitable for introducing the particularly preferred RGb structures.

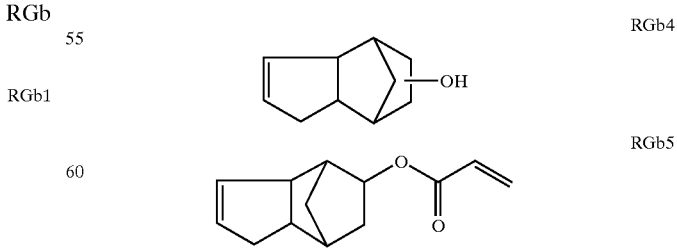

RGb4

RGb5

Hydroxy-functional compounds for introducing groups as in the formula RGb1 are dihydrodicyclopentadienyl alcohol and preferably the adducts made from DCPD and glycols, obtainable cost-effectively with acid catalysis, as in the scheme of formulae given below

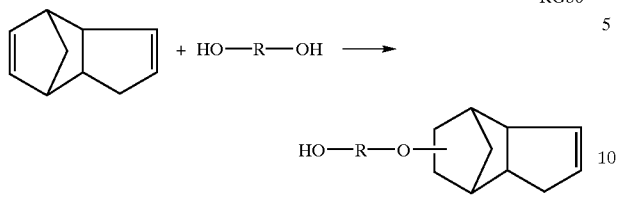

Endomethylenetetrahydrophthalic acid structures are also of interest and are generally, for example, obtainable by carrying out addition of CPD to the maleate groups.

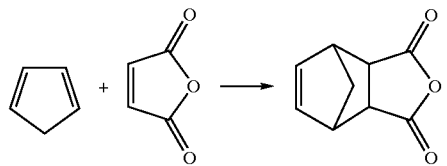

The introduction of endomethylenetetrahydrophthalic acid structures by carrying out addition of CPD to the double bonds of unsaturated polyesters is of particular interest.

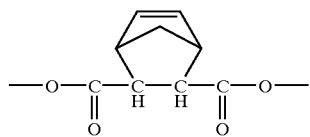

Also of interest is the introduction of endomethylenetetrahydrophthalic acid structures and tetrahydrophthalic acid structures via the imides of these acids using hydroxyalkylamines, as disclosed, for example, in DE-A-15700273 or DE-A-17200323.

The oligomeric and/or polymeric fundamental structure of the polymers IIa may comprise known polymers built up, for example, via —C—C— linkages, which may also have double and/or triple bonds, or also via ether, ester, urethane, amide, imide, imidazole, ketone, sulfide, sulfone, acetal, urea, carbonate or siloxane linkages, subject to the functionalizations more closely defined above.

Preference is given to polyesters, polyethers, polyurethanes and, particularly preferably, polyacrylates.

For the purposes of the present invention, polyesters are saturated and unsaturated polyester resins.

The polyester resins here may be built up using the usual and known carboxylic acids having $\geq 2$ carboxyl groups and/or anhydrides of these and/or esters of these and hydroxyl compounds having $\geq 2$ OH groups. Concomitant use of monofunctional compounds is also possible, for example to regulate the molecular weight of the polycondensates.

Examples of possible carboxylic acid components are α,β-ethylenically unsaturated carboxylic acids, such as maleic acid, maleic anhydride, fumaric acid, itaconic acid and citraconic acid, saturated aliphatic carboxylic acids or, respectively, anhydrides of these, such as succinic acid, adipic acid, suberic acid, sebacic acid and azelaic acid, naturally occurring fatty acids and polymerized naturally occuring fatty acids, such as linseed oil fatty acid, dimeric and polymeric linseed oil fatty acid, castor oil and castor oil fatty acid, saturated cycloaliphatic carboxylic acids or, respectively, anhydrides of these, such as tetrahydrophthalic acid, hexahydrophthalic acid, endomethylenetetrahydrophthalic acid and norbornenedicarboxylic acid, aromatic carboxylic acids or, respectively, anhydrides of these, such as the isomeric forms of phthalic acid, and also tri- and tetracarboxylic acids or, respectively, anhydrides of these, such as trimellitic acid and pyromellitic acid, and polycarboxylic acids partially esterified with allyl alcohol, e.g. monoallyl trimellitate or diallyl pyromellitate, and particular importance is placed on benzophenonecarboxylic acids, since these copolymers allow the incorporation of structures which can be excited by UV light.

Examples of possible hydroxyl components are at least dihydric, if desired alkoxylated, aliphatic and/or cycloaliphatic alcohols, such as ethylene glycol, propylene glycol, polyethylene glycols, polypropylene glycols, butanediol isomers, hexanediol, trimethylolpropane, pentaerythritol, neopentyl glycol, cyclohexanedimethanol, bisphenol A and hydrogenated bisphenol A, OH-polyfunctional polymers, such as polybutadienes modified with hydroxyl groups or polyurethane prepolymers having hydroxyl groups, glycerol, mono- and diglycerides of saturated or unsaturated fatty acids, in particular monoglycerides of linseed oil or sunflower oil. Other possible compounds are unsaturated alcohols, such as polyfunctional hydroxyl compounds (partially) etherified with allyl alcohol, e.g. trimethylolethane monoallyl ether, trimethylolethane diallyl ether, trimethylolpropane monoallyl ether, trimethylolpropane diallyl ether, pentaerythritol monoallyl ether, pentaerythritol diallyl ether, 2-butene-1,4-diol and alkoxylated 2-butene-1,4-diol.

If monofunctional substances are used to regulate the molecular weight, these are preferably monofunctional alcohols, such as ethanol, propanol, butanol, hexanol, decanol, isodecanol, cyclohexanol, benzyl alcohol or allyl alcohol. For the purposes of the present invention the term polyester also comprises polycondensates which have, besides the ester groups, amide groups and/or imide groups, as obtained by concomitant use of amino compounds. Polyesters modified in this way are known, for example, from DE-A-15700273 and DE-A-17200323. Introduction of endomethylene-tetrahydrophthalic acid structures and of tetrahydrophthalic acid structures via the imides of these acids with hydroxyalkylamines as are mentioned there implies that these are groups RGb for the purposes of the present invention.

It is also possible to carry out addition of DCPD to the double bonds of the unsaturated polyesters used, allowing the incorporation of endomethylene-tetrahydrophthalic acid structures which are RGb for the purposes of this invention. These endomethylenetetrahydrophthalic acid structures may have locations at the double bonds of the polyester along the chain and/or at terminal double bonds, for example those introduced via substances of formula 3. The double bonds of the unsaturated dicarboxylic acids and/or of unsaturated diols are RGb along the chain for the purposes of the invention. The RGs may be introduced by cocondensation and/or by polymer-analogous reactions on polyesters having functional groups. Examples of cocondensations are the concomitant use of trimethylolpropane di- and monoallyl ethers, pentaerythritol di- and monoallyl ethers, 2-butene-1, 4-diol, alkoxylated 2-butene-1,4-diol, allyl alcohol and compounds of formulae 3, 4, 5, 7 and 8.

A preferred way of introducing R[]a is the cocondensation of benzophenonecarboxylic acids or anhydrides of these. Further preference is given to the addition of the reaction products of hydroxy-benzophenones with an excess of diisocyanates to hydroxy-functional polyesters.

RGb can also be introduced into hydroxy-functional polyesters in this way. For this, diisocyanates having isocyanate groups of differing reactivity, e.g. isophorone diisocyanate or tolylene 1,4-diisocyanate, are preferably first reacted with half the stoichiometric amount of, for example, hydroxyacrylates, hydroxyvinyl ethers, hydroxyallyl esters, hydroxyallyl ethers or hydroxy-DCPD compounds of formulae AGb4 and AGb6, and these reaction products are then reacted with the hydroxy-functional polyesters. It is also possible for hydroxy-functional substances of different types to be used simultaneously in the reactions mentioned.

Poly(meth)acrylate resins functionalized with RG according to the invention are another important class of polymers according to the invention and are obtained by copolymerizing acrylates, if desired with other copolymerizable compounds.

The poly(meth)acrylate resins according to the invention may, however, also be prepared in solvents. Another advantageous method of preparing poly(meth)-acrylates is solvent-free, free-radical bulk polymerization in a stirred reactor, if desired at superatmospheric pressure, or in continuous reactors at temperatures above the melting point of the polymers formed.

Examples of components suitable for building poly(meth) acrylate resins are known acrylates and methacrylates with aliphatic, cycloaliphatic, araliphatic or aromatic alcohols having from 1 to 40 carbon atoms, e.g. methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, amyl (meth)acrylate, isoamyl (meth)acrylate, hexyl (meth)acrylate, 2-ethylhexyl (meth)acrylate, decyl (meth)acrylate, undecyl (meth)acrylate, dodecyl (meth)acrylate, tridecyl (meth)acrylate, cyclohexyl (meth)acrylate, methylcyclohexyl (meth)acrylate, benzyl (meth)acrylate, tetrahydrofurfuryl (meth)acrylate and furfuryl (meth)acrylate, and the esters of 3-phenylacrylic acid and various isomeric forms thereof, for example methyl cinnamate, ethyl cinnamate, butyl cinnamate, benzyl cinnamate, cyclohexyl cinnamate, isoamyl cinnamate, tetrahydrofurfuryl cinnamate and furfuryl cinnamate, acrylamide, methacrylamide, methylolacrylamide, methylolmethacrylamide, acrylic acid, methacrylic acid, 3-phenylacrylic acid, hydroxyalkyl (meth)acrylates, such as ethylene glycol mono(meth)acrylate, butylene glycol mono(meth)acrylates and hexanediol mono (meth)acrylate, glycol ether (meth)acrylates, such as methoxyethylene glycol mono(meth)acrylate, ethyloxyethylene glycol mono-(meth)acrylate, butyloxyethylene glycol mono (meth)-acrylate and phenyloxyethylene glycol mono(meth)-acrylate, glycidyl acrylate, glycidyl methacrylate, and amino (meth)acrylates, such as 2-aminoethyl(meth)-acrylate.

Other possible components are monomers capable of free-radical copolymerization, for example styrene, 1-methylstyrene, 4-tert-butylstyrene, 2-chlorostyrene, vinyl esters of fatty acids having 2 to 20 carbon atoms, for example vinyl acetate and vinyl propionate, vinyl ethers of alkanols having from 2 to 20 carbon atoms, such as vinyl isobutyl ether, vinyl chloride, vinylidene chloride, vinyl alkyl ketones, dienes, such as butadiene and isoprene, and also esters of maleic acid and of crotonic acid. Other suitable monomers are cyclic vinyl compounds, such as vinylpyridine, 2-methyl-1-vinylimidazole, 1-vinylimidazole, 5-vinylpyrrolidone and N-vinylpyrrolidone. It is also possible to use allylically unsaturated monomers, such as allyl alcohol, allyl alkyl esters, monoallyl phthalate and allyl phthalate. Acrolein and methacrolein and polymerizable isocyanates may also be used.

The RGs may be incorporated by copolymerization during the preparation of the polyacrylates or by subsequent polymer-analogous reaction. Examples of compounds which polymerize well and have groups RGb are dihydrodicyclopentadienyl (meth)acrylate, dihydrodicyclopentadienyl ethacrylate and dihydrodicyclopentadienyl cinnamate. Examples of compounds which polymerize well and have other groups at which a polymer-analogous functionalization is possible are copolymerizable epoxy compounds, such as glycidyl (meth)acrylate or hydroxyalkyl (meth)acrylates. The hydroxyl groups and/or epoxy groups incorporated in this way are anchor groups for polymer-analogous functionalization reactions of the polymers. Epoxy groups are, for example, suitable for introducing acrylic double bonds by reacting with (meth)acrylic acid (RGb) and/or for introducing vinyl ether groups (RGb) by reacting with aminovinyl ether compounds, such as diethanolamine divinyl ether, or for introducing benzophenone groups (RGa) by reacting with hydroxy- and/or aminobenzophenones.

Polyurethanes functionalized according to the invention with RG are another important class of polymers according to the invention and are obtained in a manner known to the skilled worker from polyfunctional, mostly bifunctional, isocyanates and polyhydroxy and/or polyamino compounds. It is also possible here to include incorporation of RGa and/or RGb directly during the build-up of the polyurethanes, or to introduce them subsequently into functional polyurethanes. The chemical reaction partners for this are essentially the same as for the polymers described above. RGa are preferably introduced via concomitant use of functional benzophenone compounds, and RGb via hydroxy-DCPD compounds of formulae RGb4 and RGb6.

Further details concerning the base polyurethane structures which can be used can be found in the corresponding discussion of the polyurethanes which can be used as polymer IIb.

Polymer IIa according to the invention is prepared following well known principles and aspects of its preparation, such as the setting of the desired molecular weight by concomitant use of regulating or monofunctional starting materials, or the setting of a desired glass transition temperature by balancing hard and soft components, are known to the skilled worker.

Particularly suitable compounds for introducing RGa in polymers IIa used according to the invention, particularly in epoxy- and/or hydroxy-functionalized polyesters, polyurethanes or polyacrylates, as described above, are:

2-, 3- and 4-hydroxybenzophenone, 2-hydroxy-5-methylhydroxybenzophenone, 2-hydroxy-4-methoxybenzophenone, 2-hydroxy-4-octyloxybenzophenone, 2-hydroxy-4-dodecyloxybenzophenone, 2-hydroxy-5-chlorohydroxybenzophenone, 2-hydroxy-4-methoxy-4'-methylbenzophenone, 2-hydroxy-5-methoxy-4'-chlorobenzophenone, 4-hydroxy-3-methylbenzophenone, 4-hydroxy-4'-methoxybenzophenone, 4-hydroxy-4'-chlorobenzophenone, 4-hydroxy-4'-fluorobenzophenone, 4-hydroxy-4'-cyanobenzophenone, 4-hydroxy-2',4'-dimethoxybenzophenone, 2,2',4,4'- and 2,4-dihydroxybenzophenone, 4-tert-butyl-2,4-dihydroxybenzophenone, 2,2'-dihydroxy-4-methoxybenzophenone, 2,2'-dihydroxy-4-octoxybenzophenone, 2,2'-dihydroxy-4,4'-dimethoxybenzophone, 2,4,4'-, 2,3,4- and 2,4,6-trihydroxybenzophenone, 2,2'-, 4,4'-, 2,3,4,4'- and 2,3',4,4'-tetrahydroxybenzophenone, 2-, 3- and 4-amino-benzophenone, 2-amino-4-methylbenzophenone, 2-amino-6-methylbenzophenone, 2-amino-4'-methylbenzophenone, 2-amino-4'-chloro-5-fluorobenzophenone, 2-amino-5-chlorobenzophenone, 2-amino-5-bromobenzophenone, 2-amino-5-methylbenzophenone, 2-amino-N-ethylbenzo-phenone, 2-amino-2',5'-dimethylbenzophenone, 4-amino-2-chlorobenzophenone, 4-amino-4'-methoxybenzophenone, 3,4-, 4,4'- and 3,3'-diaminobenzophenone, 4,4'-bis(methylamino)benzophenone, 3,3',4,4'-tetraamino-benzophenone, 2-, 3- and 4-benzoylbenzoic acid, 2-benzoyl-3'-methylbenzoic acid, 2-benzoyl-4'-ethylbenzoic acid, 2-benzoyl-3,6-dimethylbenzoic acid, 2-benzoyl-2',6'-dimethylbenzoic acid, 2-benzoyl-3',4'-dimethylbenzoic acid, 2-benzoyl-2',4',6'-dimethylbenzoic acid, 2-benzoyl-p-hydroxybenzoic acid, 2-benzoyl-4'-methyl-3'-chlorobenzoic acid, 2-benzoyl-6-chlorobenzoic acid, 4-benzoyl-4'-isopropylbenzoic acid, 4-benzoyl-4'-chlorobenzoic acid, 4-benzoyl-4'-(2-carboxypropyl)-benzoic acid, 2,4-, 3,4- and 4,4'-benzophenone-dicarboxylic acid, 2',3,4-, 3,3',4- and 3,4, 4'-benzophenonetricarboxylic acid, 3,3',4,4'-benzophenonetetracarboxylic acid and -tetracarboxylic dianhydride, 2-hydroxy-4-methoxy-5-sulfobenzophenone, 4-(4-carboxyphenyloxy)benzophenone, 4-(3,4-bis(carboxy)phenyloxy)benzophenone and the corresponding anhydride, 4-(4-carboxyphenyloxy)benzophenone-4-carboxylic acid, 4'-(4-carboxyphenyloxy)benzophenone-3,4-dicarboxylic acid and the corresponding anhydride, 4'-(3,4-bis(carboxy)phenyloxy)benzophenone-2,4- and -3,4-dicarboxylic acid and the corresponding anhydrides, 4-(4-cyanobenzoyl) thiophenol, 4-(2-hydroxy-ethoxy)phenyl (2-hydroxy-2-propyl) ketone, 4-(2-aminoethoxy)phenyl (2-hydroxy-2-propyl) ketone, 4-(2-hydroxycarbonylmethoxy)phenyl (2-hydroxy-2-propyl) ketone, 4-(2-isocyanatoethoxy)phenyl (2-hydroxy-2-propyl) ketone, 4-(2-isocyanatomethoxy) phenyl (2-hydroxy-2-propyl) ketone, 2-([2-]6-isocyanatohexylamino carbonyloxy)ethoxylthioxanthone and phenylglyoxylic acid.

The polymers IIa used may also be the polymers and copolymers discussed below under "polymers IIb", as long as these are provided with reactive groups RG, in particular RGa and/or RGb. Particular mention should be made here of polymers and copolymers of halogen-containing olefinic compounds (class 4f) provided with reactive groups RG.

The polymers IIa used according to the invention are preferably crosslinked by high-energy radiation, in particular by UV light. In most cases no other photoinitiator need be added here, i.e. the substances photocrosslink by themselves, and a particular advantage is their low level of air-inhibition. However, the addition of other commercially available photoinitiators is not ruled out. Many polymers IIa can also be crosslinked thermally. Unsaturated systems which also have DCPD groups have particularly high thermal crosslinkability in the presence of peroxides and/or of C—C-labile substances of benzpinacol type. Some systems of this type can also be cured thermally without peroxides. A preferred rapid crosslinking is achieved by combined use of heat and UV light, e.g. by combining IR and UV sources.

The polymers IIb used may comprise thermoplastic and ion-conducting polymers. Those to be mentioned in particular are:

1) Polycarbonates, e.g. polyethylene carbonate, polypropylene carbonate, polybutadiene carbonate and polyvinylidene carbonate.

2) Homopolymers, block polymers and copolymers prepared from
   a) olefinic hydrocarbons, e.g. ethylene, propylene, butylene, isobutene, propene, hexene or higher homologs, butadiene, cyclopentene, cyclohexene, norbornene, vinylcyclohexane, 1,3-pentadiene, 1,3-, 1,4- and 1,5-hexadiene, isoprene and vinylnorbornene;
   b) aromatic hydrocarbons, such as styrene and methylstyrene;
   c) acrylates or methacrylates, such as methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl and tetrafluoropropyl acrylate and, respectively, methacrylate;
   d) acrylonitrile, metehacrylonitrile, N-methylpyrrolidone, N-vinylimidazole and vinyl acetate;
   e) vinyl ethers, e.g. methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl and tetrafluoropropyl vinyl ethers;
   f) polymers and copolymers of halogen-containing olefinic compounds, e.g. vinylidene fluoride, vinylidene chloride, vinyl fluoride, vinyl chloride, hexafluoropropene, trifluoropropene, 1,2-dichloroethylene, 1,2-difluoroethylene and tetrafluoroethylene; preferably polymers or copolymers of vinyl chloride, of acrylonitrile, or of vinylidene fluoride; copolymers made from vinyl chloride and vinylidene chloride, vinyl chloride and acrylonitrile, vinylidene fluoride and hexafluoropropylene and vinylidene fluoride with hexafluoropropylene; terpolymers made from vinylidene fluoride and hexafluoropropylene, and also from a member of the class consisting of vinyl fluoride, tetrafluoroethylene, and trifluoroethylene; in particular a copolymer made from vinylidene fluoride and hexafluoropropylene; and with further preference a copolymer comprising from 75 to 92% by weight of vinylidene fluoride and from 8 to 25% by weight of hexafluoropropylene.
   g) 2-vinylpyridine, 4-vinylpyridine and vinylene carbonate.

Regulators, e.g. mercaptans, may be used during the preparation of the polymers mentioned above if this is necessary and/or desirable.

3) Polyurethanes obtainable, for example, by reacting
   a) organic diisocyanates having from 6 to 30 carbon atoms, e.g. aliphatic non-cyclic diisocyanates, e.g. hexamethylene 1,5-diisocyanate and hexamethylene 1,6-diisocyanate, aliphatic cyclic diisocyanates, e.g. cyclohexylene 1,4-diisocyanate, dicyclohexylmethane diisocyanate and isophorone diisocyanate, or aromatic diisocyanates, e.g. tolylene 2,4-diisocyanate, tolylene 2,6-diisocyanate, tetramethylxylene m-diisocyanate, tetra-methylxylene p-diisocyanate, tetrahydro-naphthylene 1,5-diisocyanate and diphenylene-methane 4,4'-diisocyanate, or mixtures of compounds of this type,
   with
   b) polyhydric alcohols, e.g. polyesterols, polyetherols and diols.

The polyesterols are advantageously predominantly linear polymers having terminal OH groups, preferably those having two or three, in particular two, terminal OH groups. The acid number of the polyesterols is less than 10 and preferably less than 3. The polyesterols may be prepared in a simple manner by esterifying aliphatic or aromatic dicarboxylic acids having from 4 to 15 carbon atoms, preferably from 4 to 6 carbon atoms, with glycols, preferably glycols having from 2 to 25 carbon atoms, or by polymerizing lactones having from 3 to 20 carbon atoms. Examples of dicarboxylic acids which may be used are glutaric acid, pimelic acid, suberic acid, sebacic acid, dodecanoic acid and preferably adipic acid and succinic acid. Suitable aromatic dicarboxylic acids are terephthalic acid, isophthalic acid, phthalic acid or mixtures of these dicarboxylic acids with other dicarboxylic acids, e.g. diphenic acid, sebacic acid, succinic acid and adipic acid. The dicarboxylic acids may be used individually or as mixtures. To prepare the polyesterols it may on occasions be advantageous to use, instead of the dicarboxylic acids, the corresponding acid derivatives, such as carboxylic anhydrides or carboxylic chlorides. Examples of suitable glycols are diethylene glycol, 1,5-pentanediol, 1,10-decanediol and 2,2,4-trimethyl-1,5-pentanediol. Preference is given to the use of 1,2-ethanediol, 1,3-propanediol, 2-methyl-1,3-propanediol, 1,4-butanediol, 1,6-hexanediol, 2,2-dimethyl-1,3-propanediol, 1,4-dimethylolcyclohexane, 1,4-diethanol-cyclohexane and ethoxylated or propoxylated products of 2,2-bis(4-hydroxyphenylene)propane (bisphenol A). Depending on the properties desired in the polyurethanes, the polyols may be used alone or as a mixture in various quantity ratios. Examples of suitable lactones for preparing the polyesterols are $\alpha,\alpha$-dimethyl-$\beta$-propiolactone, $\gamma$-butyrolactone and preferably $\epsilon$-caprolactone.

The polyetherols are essentially linear substances having terminal hydroxyl groups and containing ether bonds. Suitable polyetherols may readily be prepared by polymerizing cyclic ether, such as tetrahydrofuran, or by reacting one or more alkylene oxides having from 2 to 4 carbon atoms in the alkylene radical with a starter molecule which contains, bonded within the alkylene radical, two active hydrogen atoms. Examples of alkylene oxides are ethylene oxide, propylene 1,2-oxide, epichlorohydrin, butylene 1,2-oxide and butylene 2,3-oxide. The alkylene oxides may be used individually, alternating in succession or as a mixture. Examples of starter molecules used are water, glycols, such as ethylene glycol, propylene glycol, 1,4-butanediol and 1,6-hexanediol, amines, such as ethylenediamine, hexamethylenediamine and 4,4'-diaminodiphenyl-methane, and amino alcohols, such as ethanolamine. Suitable polyesterols and polyetherols, and also the preparation of these, are described, for example, in EP-B 416 386, and suitable polycarbonatediols, preferably those based on 1,6-hexanediol, and also the preparation of these, is described, for example, in U.S. Pat. No. 4,131,731.

Amounts of up to 30% by weight, based on the total weight of the alcohols, of aliphatic diols having from 2 to 20 carbon atoms, preferably 2 to 10 carbon atoms can advantageously be used, for example 1,2-ethanediol, 1,3-propanediol, 1,4-butanediol, 1,6-hexanediol, 1,5-pentanediol, 1,10-decanediol, 2-methyl-1,3-propanediol, 2,2-dimethyl-1,3-propane- diol, 2-methyl-2-butyl- 1,3-propanediol, 2,2-dimethyl- 1,4-butanediol, 1,4-dimethylolcyclohexane, neopentyl glycol hydroxypivalate, diethylene glycol, triethylene glycol or methyldiethanolamine, or aromatic-aliphatic or aromatic-cycloaliphatic diols having from 8 to 30 carbon atoms, where possible aromatic structures are heterocyclic ring systems or preferably isocyclic ring systems, such as naphthalene derivatives or in particular benzene derivatives, such as bisphenol A, doubly symmetrically ethoxylated bisphenol A, doubly symmetrically propoxylated bisphenol A, more highly ethoxylated or propoxylated bisphenol A derivatives or bisphenol F derivatives, or also mixtures of compounds of this type.

Amounts of up to 5% by weight, based on the total weight of the alcohols, of aliphatic triols having from 3 to 15 carbon atoms, preferably from 3 to 10 carbon atoms may advantageously be used, for example trimethylolpropane or glycerol, the reaction product of compounds of this type with ethylene oxide and/or propylene oxide, or also mixtures of compounds of this type.

The polyhydric alcohols may have functional groups, for example neutral groups, such as siloxane groups, basic groups, such as in particular tertiary amino groups, or acid groups, or salts thereof, or groups which readily convert into acid groups, which are introduced via a polyhydric alcohol. Use may advantageously be made of diol components which have groups of this type, for example N-methyldiethanolamine, diethyl N,N-bis(hydroxyethyl) aminomethylphosphonate or 3-sulfopropyl N,N-bis (hydroxyethyl)-2-aminoacetate, or dicarboxylic acids which have groups of this type and can be used for preparing polyesterols, for example 5-sulfoisophthalic acid.

Acid groups are in particular the phosphoric acid, phosphonic acid, sulfuric acid, sulfonic acid, carboxyl or ammonium group.

Examples of groups which readily develop into acid groups are the ester group or salts, preferably of the alkali metals, such as lithium, sodium or potassium.

4) The polyesterols described above per se, where care should be given to obtaining molecular weights of from 10,000 to 2,000,000, preferably from 50,000 to 1,000, 000.

5) Polyamines, polysiloxanes and polyphosphazenes, in particular those discussed in the description of the polymer IIb2 above.

6) Polyetherols, as described, for example, in the discussion above of the polymer IIb1, as compound (c), or in the discussion of the polyurethanes.

It is, of course, also possible to use mixtures of the above polymers IIb. The copolymers IIb used according to the invention may, depending on the manner of preparation, contain a random distribution of the monomers, or may be block copolymers.

The polymers IIa and IIb are polymerized in a conventional manner known to the skilled worker, preferably free-radical polymerization. The polymers IIa and IIb may be used in high-molecular-weight or oligomeric form or as mixtures of these.

The proportion of the polymer IIa in the polymeric binder II is generally from 1 to 100% by weight, preferably from 20 to 80% by weight, more preferably from 30 to 60% by weight. The proportion of the polymer IIb to the polymeric binder II is correspondingly generally from 0 to 99% by weight, preferably from 20 to 80% by weight and more preferably from 40 to 70% by weight.

The present invention preferably provides composites with a first layer which comprises the following composition:

Compositions as defined above where the polymer IIa has, along the chain, terminally and/or laterally, at least one reactive group RGa which is capable of hydrogen abstraction when exposed to heat and/or UV radiation, in the triplet excited state, and has, along the chain, terminally and/or laterally, at least one group RGb different from RGa and coreactive with RGa, where on average across all of the polymer molecules there is at least one group RGa and at least one group RGb.

Compositions as defined above where the polymer IIa is a polymer or copolymer of an acrylate or methacrylate and has reactive groups RGa which contain benzophenone units and reactive groups RGb which contain dihydrodicyclopentadiene units.

Compositions as defined above where the polymer IIb is selected from the class consisting of a polymer or copolymer of vinyl chloride, of acrylonitrile or of vinylidene fluoride; a copolymer made from vinyl chloride and vinylidene chloride, vinyl chloride and acrylonitrile, vinylidene fluoride and hexafluoropropylene or vinylidene fluoride with hexafluoropropylene; a terpolymer made from vinylidene fluoride and hexafluoropropylene, and also a member of the class consisting of vinyl fluoride, tetrafluoroethylene and trifluoroethylene.

Compositions as defined above where the polymer IIa is a polymer or copolymer of an acrylate or methacrylate and has reactive groups RGa which contain benzophenone units and reactive groups RGb which contain dihydrocyclopentadiene units, and the polymer IIb is a copolymer made from vinylidene fluoride and hexafluoropropylene.

The compositions used according to the invention may moreover comprise a plasticizer III. However, a plasticizer need not be used.

The proportion of the plasticizer III, if used, based on the composition, is from 0.1 to 100% by weight, preferably from 0.5 to 50% by weight and in particular from 1 to 20% by weight.

Examples of plasticizers III are those described in DE-A 198 19 752, preferably dimethyl carbonate, diethyl carbonate, dipropyl carbonate, ethylene carbonate, propylene 1,2-carbonate, propylene 1,3-carbonate, organic phosphorus compounds, in particular phosphates and phosphonates, e.g. trimethyl phosphate, triethyl phosphate, tripropyl phosphate, tributyl phosphate, tris(2-ethylhexyl) phosphate, polyalkylene oxide ethers and polyalkylene oxide esters, e.g. diglyme compounds, triglyme compounds and tetraglyme compounds, polymeric plasticizers, e.g. thermoplastic polyurethanes or polyamides, and also mixtures of these.

The compositions used according to the invention may be dispersed or dissolved in an inorganic or organic, preferably an organic liquid diluent, in which the mixture according to the invention should have a viscosity of preferably from 100 to 50,000 mPas, and then be applied to a substrate in a manner known per se, for example spray coating, casting, dipping, spin coating, roller coating, relief printing, gravure printing or planography or screen printing. Further processing may proceed as usual, e.g. by removing the diluent and curing the mixture.

Suitable organic diluents are aliphatic ethers, in particular tetrahydrofuran and dioxane, hydrocarbons, in particular hydrocarbon mixtures, such as petroleum spirit, toluene or xylene, aliphatic esters, in particular ethyl acetate and butyl acetate, and ketones, in particular acetone, ethyl methyl ketone and cyclohexane, and also DMF and NMP. It is also possible to use combinations of diluents of this type.

Possible substrates are the materials usually used for electrodes, preferably metals, such as aluminum or copper. It is also possible to use temporary substrates, such as films, in particular polyester films, such as polyethylene terephthalate films. Films of this type may advantageously have a release layer, preferably made from polysiloxanes.

The separators may also be produced thermoplastically, for example by injection molding, melt casting, compression, kneading or extruding, and if desired the composition used according to the invention may be calendered in a subsequent step.

After the film has been formed from the composition used according to the invention, volatile components, such as solvents or plasticizers, may be removed.

The composition used according to the invention may be crosslinked in a manner known per se, for example by irradiating with ionic or ionizing radiation, or an electron beam, preferably with an acceleration voltage of from 20 to 2000 kV and a radiation dose of from 5 to 50 Mrad, or with UV or visible light, advantageously adding, in the usual manner, an initiator such as benzil dimethyl ketal or 1,3,5-trimethylbenzoyltriphenylphosphine oxide in amounts of in particular not more than 1% by weight, based on the polymer IIa, and crosslinking generally within a period of from 0.5 to 15 minutes; by thermal crosslinking via free-radical polymerization, preferably at above 60° C., where an initiator may advantageously be added, for example azobisisobutyronitrile in amounts of generally not more than 5% by weight, preferably from 0.05 to 1% by weight, based on the polymer IIa; by electrochemically induced polymerization; or by ionic polymerization, for example by acid-catalyzed cationic polymerization, where possible catalysts are primarily acids, preferably Lewis acids, such as $BF_3$, or in particular $LiBF_4$ or $LiPF_6$. Catalysts containing lithium ions, such as $LiBF_4$ or $LiPF_6$ may advantageously remain here in the solid electrolyte or separator as conducting salt.

The crosslinking described above may, but need not, take place under an inert gas. The irradiation time here may according to the invention be controlled so that either complete crosslinking takes place or there is merely a short period of UV-light preirradiation to give only partial crosslinking.

As mentioned at the outset, the at least one second layer of the molding according to the invention comprises a conventional separator. According to the invention any conventional separator may be used here.

The following should be mentioned in particular in this connection:

separators based on microporous polyolefin films, as commercially available, for example, with the tradenames Celgardo® and Hipore® and described, inter alia, in EP-A 0 718 901 and EP-B 0 715 364, the entire scope of both of which is incorporated into the present application by way of reference; polyethylene films and polypropylene films, and also films which comprise blends of polyethylene and, respectively, polypropylene with other polymers are similarly useful here;

microporous polytetrafluoroethylene (PTFE) films from Goretex, as described, for example, in EP-A 0 798 791, which is also incorporated into the present application by way of reference;

webs, fibers, and also nonwovens, all of which can be produced using fibrous polymer materials, e.g. polyolefin, polyamide or polyester fibers;

films available with the tradename Nafion®;

films based on a copolymer of vinylidene difluoride and hexafluoropropene, as described, for example, in U.S. Pat. No. 5,540,741 and U.S. Pat. No. 5,478,668;

homopolymers, block polymers and copolymers which in each case contain filler and can be obtained by extrusion, prepared from
  (a) olefinic hydrocarbons, e.g. ethylene, propylene, butylene, isobutene, propene, hexene or higher homologs, butadiene, cyclopentene, cyclohexene, norbornene or vinylcyclohexane;
  (b) aromatic hydrocarbons, e.g. styrene or methylstyrene;
  (c) acrylates or methacrylates, such as methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl or tetrafluoropropyl acrylate and, respectively, methacrylate;
  (d) acrylonitrile, methacrylonitrile, N-methylpyrrolidone, N-vinylimidazole or vinyl acetate;

(e) vinyl ethers, e.g. methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl or tetrafluoropropyl vinyl ether;

(f) halogen-containing olefinic compounds, such as vinyl chloride, vinyl fluoride, vinylidene fluoride, vinylidene chloride, hexafluoropropene, trifluoropropene, 1,2-dichloroethene, 1,2-difluoroethene or tetrafluoroethene, where the solids (I) according to the invention are used as fillers in these polymers; the composition and production of extruder films of this type are described in detail in DE-A 19713072.0.

To produce the novel composite, the at least one first layer is brought together with the at least one second layer, and according to the invention any known process may be used to bring layers of this type together. For example, the first layer may be applied to the second layer by processes at atmospheric pressure, e.g. casting or doctoring of the starting material for the first layer, or also by processes at superatmospheric pressure, e.g. extrusion, lamination, in particular hot lamination, calendering or compression. The resultant composite here may be cured or crosslinked by radiation, or electrochemically or thermally. In addition, the starting material for the at least one first layer may firstly be cured or crosslinked thermally, either partially or completely, and then, as described above, brought together at atmospheric pressure or at superatmospheric pressure with the second layer used according to the invention. If prefabricated films, i.e. the at least one first layer in the form of a film and also the conventional separator in the form of a film, are to be brought together, this preferably takes place by lamination, generally at from about 100 to about 160° C., preferably from about 115 to about 140° C. (hot lamination), where in each case the precise temperatures used depend, in particular, on the respective conventional separator used. For example, if polypropylene films are used here the temperatures may be slightly higher than when polyethylene films are used. If the composite is produced by lamination, the composition of the first layer may also be in partially or completely crosslinked form and the composite obtained after lamination may, if required, be crosslinked again or else used directly without post-crosslinking.

If the novel composite is used as a separator in an electrochemical cell, the composite is combined with conventional anodes and cathodes. In addition, a dissociable compound containing lithium cations, known as a conducting salt, and, if desired, other additives, such as in particular organic solvents, sometimes called an electrolyte, may be incorporated. Some or all of the lastmentioned substances may be admixed during the production of the novel composite or introduced after it has been produced.

Conducting salts which may be used are well known and described, for example, in EP-A 0 096 629. Conducting salts preferably used according to the invention are $LiPF_6$, $LiBF_4$, $LiClO_4$, $LiAsF_6$, $LiCF_3SO_3$, $LiC(CF_3SO_2)_3$, $LiN(CF_3SO_2)_2$, $LiN(SO_2C_nF_{2n+1})_2$, $LiC[(C_nF_{2n+1})SO_2]_3$, $Li(C_nF_{2n+1})SO_2$, where n is in each case from 2 to 20, $LiN(SO_2F)_2$, $LiAlCl_4$, $LiSiF_6$, $LiSbF_6$, $(RSO_2)_nXLi$ ($_nX=_1O$, $_1S$, $_2N$, $_2P$, $_3C$, $_3Si$; $R=C_mF_{2m+1}$ where m=0–10 or $C_1$–$C_{20}$ hydrocarbons), Li imide salts, Li methide salts, or a mixture of two or more of these, and the use of $LiPF_6$ as conducting salt is preferred.

Possible organic electrolyte solvents are the compounds discussed above under "plasticizers", and those preferably used are the conventional organic electrolytes, preferably esters, such as ethylene carbonate, propylene carbonate, dimethyl carbonate or diethyl carbonate, or mixtures of compounds of this type.

The thickness of the novel composites is advantageously from 5 to 500 µm, preferably from 10 to 500 µm, more preferably from 10 to 200 µm and in particular from 15 to 100 µm.

The composite may be assembled with the anodes and cathodes to give an electrochemical cell, which in turn is a solid composite article. This composite article advantageously has an overall thickness of from 30 to 2000 µm, in particular an overall thickness of from 50 to 1000 µm.

The present invention also provides a process which produces a composite of this type and comprises the following stages:

(I) producing at least one first layer as defined above;

(II) producing at least one second layer as defined above; and (III) then combining the at least one first layer with the at least one second layer, by a conventional layering process.

The at least one first layer is preferably produced on a temporary substrate. According to the invention, conventional temporary substrates may be used here, e.g. a release film made from a polymer or from a preferably coated paper, e.g. a siliconized polyester film. However, this first layer may also be produced on a permanent substrate, e.g. a collector electrode, or else even entirely without a substrate.

The bringing together and the production of the layer defined above takes place by means of atmospheric-pressure processes for providing layers or for the production of films, such as casting or doctoring, or else by processes at superatmospheric pressure, such as extrusion, lamination, in particular hot lamination, calendering or compression. The resultant composite may, if desired, be cured or crosslinked by radiation or electrochemically or thermally.

It is also possible to use the process described above to bring the novel composite together with conventional electrodes and so to prepare a composite article with the constituents (release film/separator/electrode).

It is also possible, by double-sided coating of the composite, to provide a composite article with the constituents anode/separator/cathode.

For this, the composite, as a separator, with the anode film and/or cathode film, may be laminated together at >80° C. The novel composite here may readily be laminated to a conventional anode or cathode, giving a composite article—anode/- or cathode/-separator—which may then, in turn, be combined with a conventional cathode or anode.

A composite article of anode/separator/cathode as described above may also be produced without using a substrate and, respectively, the collector electrodes, since the novel composite comprising at least one first and at least one second layer, as defined above, has per se sufficient mechanical stability for use in electrochemical cells.

The electrolyte and conducting salt may be placed into composite articles of this type or into the electrochemical cell either before the layers are brought together or preferably after the layers have been brought together, if desired after contact has been made with suitable collector electrodes, e.g. with a metal foil, or even after the composite or, respectively, the composite article, has been introduced into a battery casing. Here, the specific microporous structure of the layers in the novel composite, determined in particular by the presence of the solid (I) defined above permits the electrolyte and the conducting salt to be absorbed with displacement of the air in the pores. Depending on the electrolyte used, the loading may take place at from 0 to about 100° C.

The novel electrochemical cells may be used in particular as an automobile battery, appliance battery, flat-type battery, on-board battery, battery for static applications, or electrotraction battery.

The novel composite has the following advantages over the separators hitherto provided for use in electrochemical cells:

the combination of a conventional separator and the composition containing a solid (I) gives a composite which has exceptional mechanical stability, in particular excellent dimensional stability and improved compressive strength;

the novel composite may be used without difficulty in battery production on commercially available winding machinery used for that purpose;

the novel composite is a separator with shutdown mechanism.

Some examples will now be used to describe the present invention.

DETAILED DESCRIPTION OF THE PREFERRED EMBODIMENTS

Preparation Example 1 (PA 1)

800 g of xylene were heated to 85° C.

A feed I, composed of a mixture made from

| | |
|---|---|
| 100 g of | lauryl acrylate, |
| 300 g of | dihydrodicyclopentadienyl acrylate, |
| 120 g of | glycidyl methacrylate, |
| 480 g of | ethylhexyl acrylate and |
| 2 g of | mercaptoethanol | was started at the same time as a feed II composed of

| | |
|---|---|
| 30 g of | Wako V 59 (Azostarter V 59) and |
| 200 g of | xylene. |

Feed I was run into the initial charge within a period of 1.5 hours, and feed II within a period of 2 hours. The temperature here was held at from 80 to 90° C. The mixture was allowed to continue reacting at 90° C. for 3 hours.

166 g of 4-hydroxybenzophenone and 0.83 g of dimethylaminopyridine were then added. The reaction was allowed to continue for from 2 to 3 hours until an epoxide value of <0.01 had been achieved.

EXAMPLE 1

20 g of a methacrylic silane hydrophobicized wollastonite (Tremin® 283-600 MST) were dispersed in 15 g of acetone. 54 g of a solution of 6 g of a vinylidene fluoride-hexafluoropropylene copolymer (Kynarflex® 2801, ELF Atochem) and a solution of 4.6 g of the PA1 prepared as in Preparation Example 1 were then added in 34 g of xylene. Finally, 2.8 g of tris(2-ethylhexyl) phosphate were added.

The resultant composition was then applied at 60° C. to a substrate using a doctor with a casting gap of 500 μm the solvents were removed within a period of 5 min and the film obtained after the dried coating had been peeled away had a thickness of about 27 μm.

The resultant film was laminated to a commercially available microporous PE film of thickness 8 μm (Celgard®) without other additives, with the laminator rolls at 115° C. An Ibico laminator was used. Once the lamination was complete, the layer laminated onto the microporous PE film was photocrosslinked for 5 min at a distance of 5 cm in a field of superactinic fluorescent tubes (TL 09, Philips).

The resultant composite was used as a separator and assembled, together with $LiCoO_2$ as cathode and graphite as anode, to give a "sandwich" cell. Using $LiPF_6$ as conducting salt and a 1:1 mixture of ethylene carbonate,and diethylene carbonate as liquid electrolyte, the electrochemical cell obtained was cycled applying a voltage of 4.15 V.

The specific battery data achieved using this cell were as follows:

Battery Test

Cathode surface area: 1 $cm^2$

Anode surface area: 1 $cm^2$

Cathode weight per unit area: 270 $g/m^2$

Electrolyte: 1M $LiPF_6$/ethylene carbonate (EC): diethylene carbonate (DEC)=1:1

TABLE 1

| Cycle | Li (in) | Li (out) | Coulomb efficiency [%] |
|---|---|---|---|
| 1 | −96 | 105 | 91 |
| 2 | −97 | 97 | 100 |
| 3 | −94 | 96 | 98 |
| 4 | −93 | 93 | 98 |
| 5 | −89 | 89 | 100 |

Figure 1:
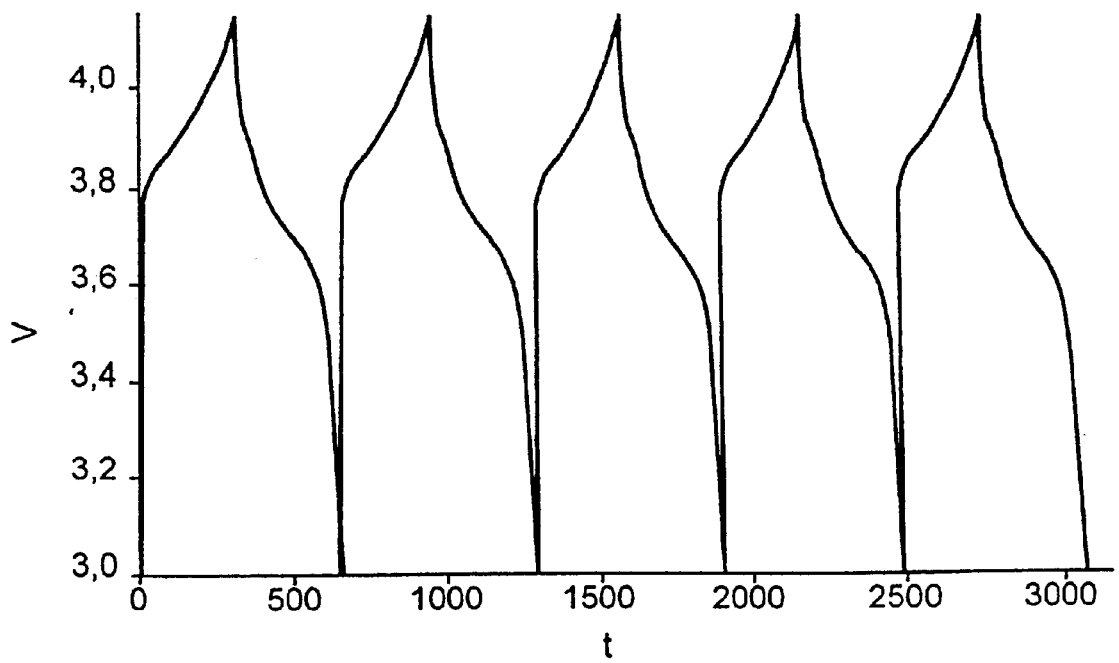
FIGS. 1 to 5 here in each case show the results from cycling (voltage: 4.15 V) of the electrochemical cells obtained as in Examples 1 to 5.
Figure 2:
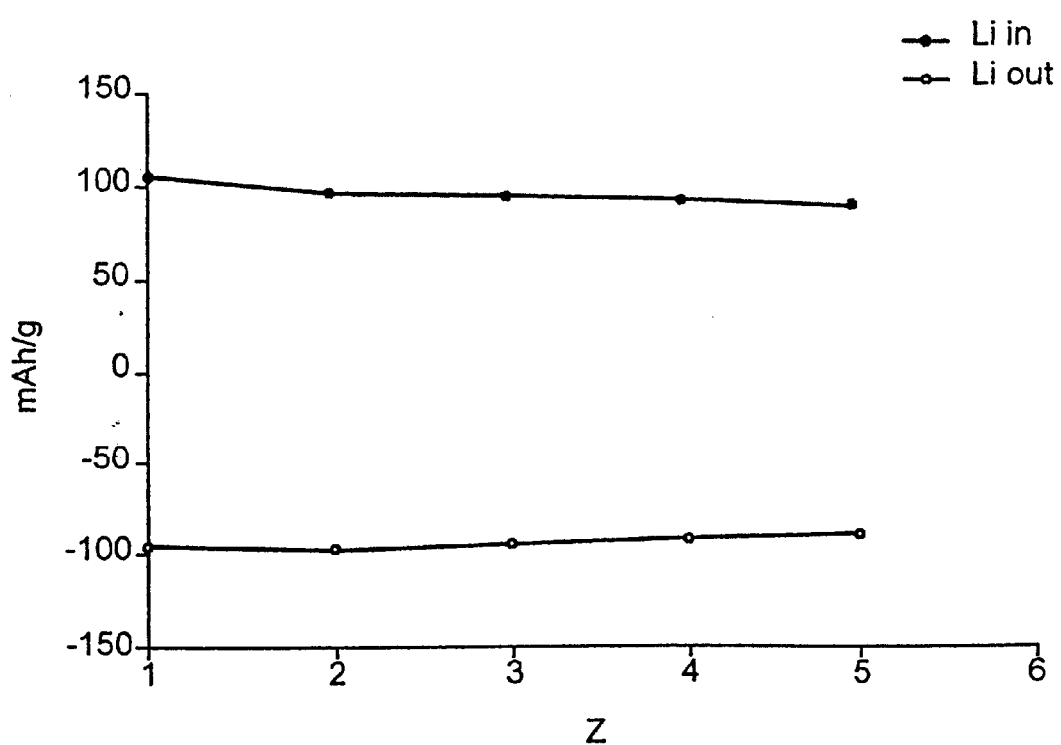

The results from this cycling are given in Table 1 above and, respectively, in FIGS. 1 and 2. FIG. 1 here shows the plot of charging and discharging tests against time, where V is the voltage applied and t is the time elapsed. It is noticeable that the charging and, respectively, discharge capacity of the sandwich cell of Example 1 does not change with time. This is confirmed by FIG. 2, in which the specific charging and, respectively discharge capacity [mAh/g] has been plotted against the number of cycles (Z). It can be seen that at, for example, the $5^{th}$ cycle this cell had a specific charging capacity at the cathode of 89 mAhg/g.

EXAMPLE 2

Figure 3:
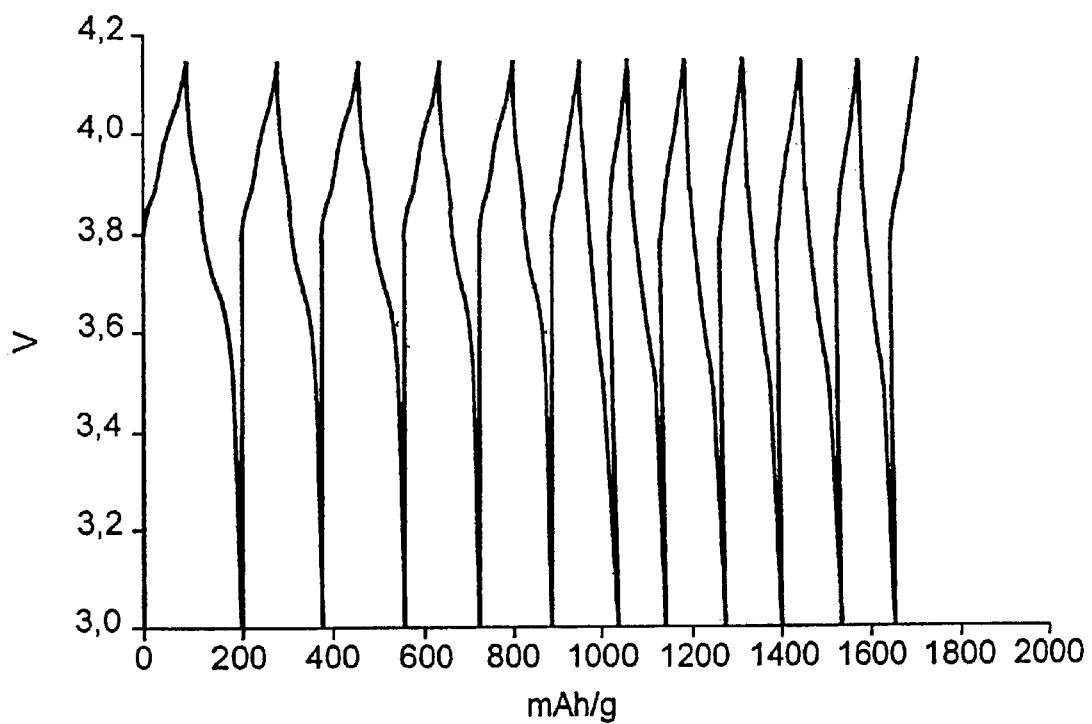

A composite was produced in a manner similar to that of Example 1 using PA1 as crosslinking system, except that the film initially obtained was irradiated under the conditions of Example 1 for 2 seconds and then brought together with the PE film in a manner similar to that of Example 1. The resultant composite was then UV-irradiated as in Example 1 and used as a separator. Table 2 and FIG. 3 show the results of the studies of electrochemical activity.

TABLE 2

| Cycle | Half | Current density | Specific capacity [mAh/g] | |
|---|---|---|---|---|
| No. | cycle | [mA/cm²] | Charging | Discharge |
| 1 | c(Li out) | 0.5 | 111.6 | |
| | d(Li in) | −1.0 | | 89.1 |
| 2 | c(Li out) | 0.5 | 94.8 | |
| | d(Li in) | −1.0 | | 88.3 |

TABLE 2-continued

| Cycle No. | Half cycle | Current density [mA/cm²] | Specific capacity [mAh/g] Charging | Specific capacity [mAh/g] Discharge |
|---|---|---|---|---|
| 3 | c(Li out) | 0.5 | 89.2 | |
|   | d(Li in)  | −1.0 |      | 85.5 |
| 4 | c(Li out) | 0.5 | 85.7 | |
|   | d(Li in)  | −1.0 |      | 83.5 |
| 5 | c(Li out) | 0.5 | 84.6 | |
|   | d(Li in)  | −1.0 |      | 82.1 |
| 6 | c(Li out) | 0.5 | 82.9 | |
|   | c(Li out) | 0.25 | 6.4 | |
|   | d(Li in)  | −3.0 |      | 59.5 |
| 7 | c(Li out) | 1.0 | 48.7 | |
|   | d(Li in)  | −2.0 |      | 66.7 |
| 8 | c(Li out) | 1.0 | 65.0 | |
|   | d(Li in)  | −2.0 |      | 66.6 |
| 9 | c(Li out) | 1.0 | 66.7 | |
|   | d(Li in)  | −2.0 |      | 65.8 |
| 10 | c(Li out) | 1.0 | 66.1 | |
|    | d(Li in)  | −2.0 |      | 64.7 |
| 11 | c(Li out) | 1.0 | 65.1 | |
|    | d(Li in)  | −2.0 |      | 63.6 |
| 12 | c(Li out) | 0.5 | 72.5 | |
|    | c(Li out) | 0.25 | 6.0 | |

The discharge capacity obtained for this cell at the 5$^{th}$ cycle was about 82 mAh/g.

EXAMPLE 3

Figure 4:
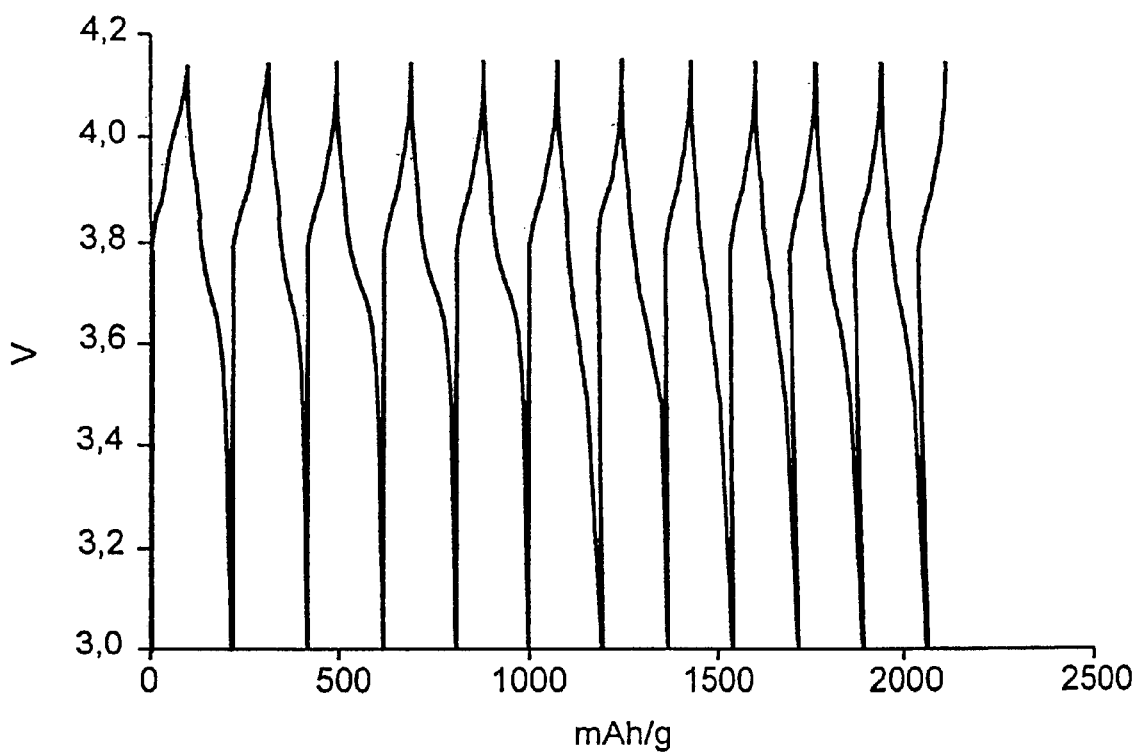

An electrochemical cell was produced in a manner similar to that of Example 2, but in Example 3 the composite initially obtained received no further UV post-irradiation. Cycling then followed as in Example 1 or 2. The results of this cycling are shown in Table 3 and, respectively, FIG. 4.

TABLE 3

| Cycle No. | Half cycle | Current density [mA/cm²] | Specific capacity [mAh/g] Charging | Specific capacity [mAh/g] Discharge |
|---|---|---|---|---|
| 1 | c(Li out) | 0.5 | 126.0 | |
|   | d(Li in)  | −1.0 |       | 97.9 |
| 2 | c(Li out) | 0.5 | 100.3 | |
|   | d(Li in)  | −1.0 |       | 97.2 |
| 3 | c(Li out) | 0.5 | 100.8 | |
|   | d(Li in)  | −1.0 |       | 96.9 |
| 4 | c(Li out) | 0.5 | 99.5 | |
|   | d(Li in)  | −1.0 |      | 96.2 |
| 5 | c(Li out) | 0.5 | 99.0 | |
|   | d(Li in)  | −1.0 |      | 95.5 |
| 6 | c(Li out) | 0.5 | 97.6 | |
|   | c(Li out) | 0.25 | 5.4 | |
|   | d(Li in)  | −3.0 |      | 91.1 |
| 7 | c(Li out) | 1.0 | 83.7 | |
|   | d(Li in)  | −2.0 |      | 88.4 |
| 8 | c(Li out) | 1.0 | 89.3 | |
|   | d(Li in)  | −2.0 |      | 88.1 |
| 9 | c(Li out) | 1.0 | 89.9 | |
|   | d(Li in)  | −2.0 |      |      |
| 10 | c(Li out) | 1.0 | 89.6 | |
|    | d(Li in)  | −2.0 |      | 87.5 |
| 11 | c(Li out) | 1.0 | 88.6 | |
|    | d(Li in)  | −2.0 |      | 86.8 |
| 12 | c(Li out) | 0.5 | 94.5 | |
|    | c(Li out) | 0.25 | 4.5 | |

The discharge capacity obtained for this cell at the 5$^{th}$ cycle was about 95.5 mAh/g.

EXAMPLE 4

A film was first produced as in Example 1 and, without having been radiated, laminated to an anode (graphite on Cu film) at 140° C., and the resultant composite article was laminated at 115° C. to a microporous PE film (Celgarde®) of 8 μM thickness.

Figure 5:
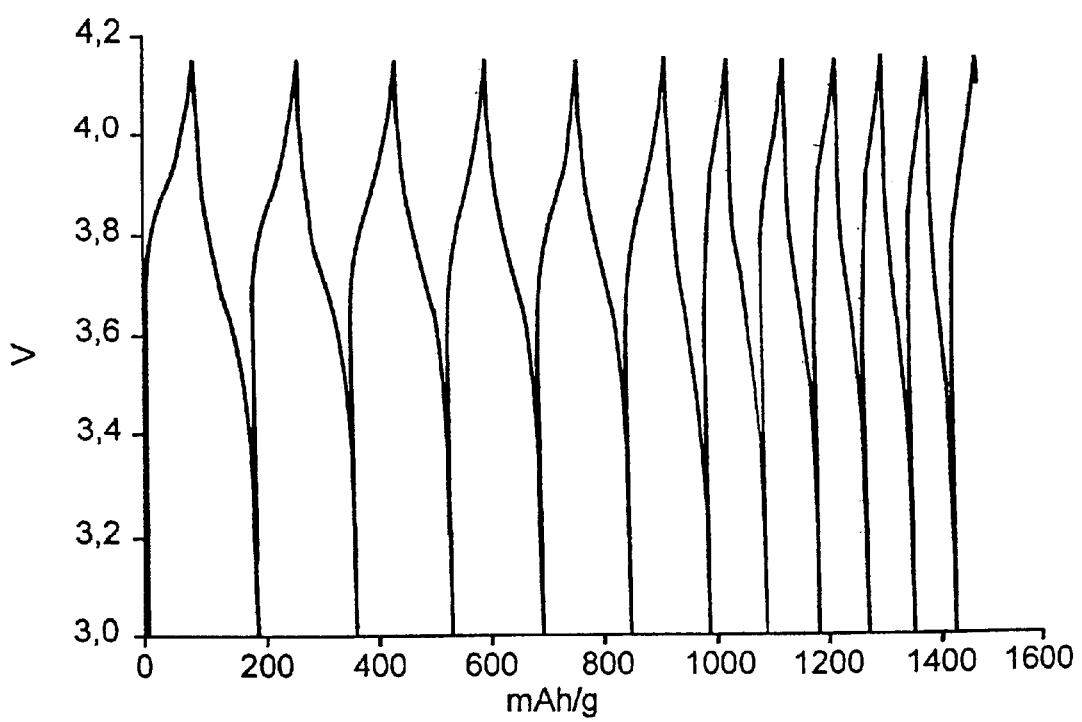

A "sandwich" cell was assembled in a manner similar to that of Example 1 using $LiCoO_2$ as cathode and its electrochemical activity studied. The results are given in Table 4 and FIG. 5.

TABLE 4

| Cycle No. | Half cycle | Current density [mA/cm²] | Specific capacity [mAh/g] Charging | Specific capacity [mAh/g] Discharge |
|---|---|---|---|---|
| 1 | c(Li out) | 0.5 | 108.4 | |
|   | d(Li in)  | −1.0 |       | 81.2 |
| 2 | c(Li out) | 0.5 | 91.0 | |
|   | d(Li in)  | −1.0 |      | 83.7 |
| 3 | c(Li out) | 0.5 | 88.4 | |
|   | d(Li in)  | −1.0 |      | 81.7 |
| 4 | c(Li out) | 0.5 | 85.4 | |
|   | d(Li in)  | −1.0 |      | 79.7 |
| 5 | c(Li out) | 0.5 | 82.1 | |
|   | d(Li in)  | −1.0 |      | 77.0 |
| 6 | c(Li out) | 0.5 | 77.9 | |
|   | c(Li out) | 0.25 | 4.2 | |
|   | d(Li in)  | −3.0 |      | 62.3 |
| 7 | c(Li out) | 1.0 | 49.3 | |
|   | d(Li in)  | −2.0 |      | 51.8 |
| 8 | c(Li out) | 1.0 | 49.9 | |
|   | d(Li in)  | −2.0 |      | 47.2 |
| 9 | c(Li out) | 1.0 | 46.6 | |
|   | d(Li in)  | −2.0 |      |      |
| 10 | c(Li out) | 1.0 | 43.7 | |
|    | d(Li in)  | −2.0 |      | 41.3 |
| 11 | c(Li out) | 1.0 | 41.1 | |
|    | d(Li in)  | −2.0 |      | 38.8 |
| 12 | c(Li out) | 0.5 | 54.3 | |
|    | c(Li out) | 0.25 | 5.0 | |

The discharge capacity obtained for this cell at the 5$^{th}$ cycle was about 77 mAh/g.

Examples 5 and 6 are described below and both relate to the production of a novel composite, which can then be used in a manner similar to that of the composites described in Examples 1 to 4 in electrochemical cells.

EXAMPLE 5

A suspension composed of

| 20 g of | Tremin ® 800 EST wollastonite |
| 34 g of | xylene |
| 6 g of | Kynarflex ® 2801 |
| 2.9 g of | tris(2-ethylhexyl) phosphate |
| 15 g of | acetone and |
| 4.6 g of | a solution composed of |
| 100 g of | lauryl acrylate |
| 300 g of | dihydrodicyclopentadienyl acrylate |
| 120 g of | glycidyl methacrylate |
| 480 g of | ethylhexyl acrylate |
| 2 g of | mercaptoethanol |
| 30 g of | Wako ® V79 |
| 200 g of | xylene |
| 166 g of | 4-hydroxybenzophenone and |
| 0.83 g of | dimethylaminopyridine | was applied by doctoring to a microporous polyolefin film (Celgard® 2300), dried at room temperature and cured photochemically as described in Example 1, and dried in vacuo (<0.1 mbar).

EXAMPLE 6

A suspension composed of

| | |
|---|---|
| 30 g of | Kynarflex ® 2801 |
| 20 g of | Aerosil ® |
| 12.5 g of | dibutyl phthalate and |
| 200 g of | acetone | was applied by doctoring to a microporous polyolefin film (Celgard® 2300) and dried at room temperature. The composite was then extracted several times with diethyl ether.

We claim:

1. A composite comprising at least one layer which comprises a composition comprising
    (a) from 1 to 99% by weight of a solid (I) with a primary particle size of from 5 nm to 100 μm or a mixture made from at least two solids,
    (b) from 99 to 1% by weight of a polymeric binder (II) which includes:
        (IIa) from 1 to 100% by weight of a polymer or copolymer (IIa) which has, along the chain, terminally and/or laterally, reactive groups (RG) which are capable of crosslinking reactions when exposed to heat and/or UV radiation, and
        (IIb) from 0 to 99% by weight of at least one polymer or copolymer (IIb) which is free from reactive groups RG,
            where the at least one layer has been applied to at least one second layer comprising at least one conventional separator, characterized in that the conventional seperator is selected from the group consisting of: separators based on microporous polyolefin films; microporous polytetrafluoroethylene (PTFE) films; webs, fibers, and nonwovens, all of which can be produced using fibrous polymer materials; Nafion® films; films based on a copolymer of vinylidene difluoride and hexafluoropropene;
            homopolymers, block polymers and copolymers which in each case contain filler and can be obtained by extrusion, prepared from olefinic hydrocarbons, aromatic hydrocarbons, acrylates or methacrylates, acrylonitrile, methacrylonitrile, N-methylpyrrolidone, N-vinylimidazole, vinyl acetate, vinyl ethers, or halogen-containing olefinic compounds, where the solids (I) are used as fillers in these polymers.

2. A composite as claimed in claim 1, where the at least one conventional separator is selected from the class consisting of a microporous polyolefin film and a polytetrafluoroethylene film.

3. A composite as claimed in claim 1, where the solid I is selected from the class consisting of an inorganic solid, selected from the class consisting of oxides, mixed oxides, silicates, sulfates, carbonates, phosphates, nitrides, amides, imides and carbides of elements of the $1^{st}$, $2^{nd}$, $3^{rd}$ or $4^{th}$ principal group, or the $4^{th}$ transition group, of the periodic table; a polymer selected from the class consisting of polyethylene, polypropylene, polystyrene, polytetrafluoroethylene and polyvinylidene fluoride; polyamides; polyimides; and a solid dispersion comprising a polymer of this type; and a mixture of two or more of these.

4. A composite as claimed in claim 1, where the polymer IIa has, along the chain, terminally and/or laterally, at least one reactive group RGa which is capable of hydrogen abstraction in the triplet excited state when exposed to heat and/or UV radiation, and has, along the chain, terminally and/or laterally, at least one group RGb different from RGa and coreactive with RGa, where on average across all of the polymer molecules there is at least one group RGa and at least one group RGb, where the group RGb is selected from groups which can interact with excited Norrish II photoinitiator groups.

5. A composite as claimed in claim 1, where the polymer IIa has, along the chain, terminally and/or laterally, at least one reactive group RGa which is capable of hydrogen abstraction in the triplet excited state when exposed to heat and/or UV radiation, and has, along the chain, terminally and/or laterally, at least one group RGb different from RGa and coreactive with RGa, where on average across all of the polymer molecules there is at least one group RGa and at least one group RGb, where the group RGb is selected from groups which can interact with excited Norrish II photoinitiator groups.

6. A composite as claimed in claim 1, where the polymer IIa is a polymer or copolymer of an acrylate or methacrylate and has reactive groups RGa which contain benzophenone units and reactive groups RGb which contain dihydrodicyclopentadiene units.

7. Composite as claimed in claim where the polymer IIb is selected from the class consisting of a polymer or copolymer of vinyl chloride, of acrylonitrile or of vinylidene fluoride; a copolymer made from vinyl chloride and vinylidene chloride, vinyl chloride and acrylonitrile, vinylidene fluoride and hexafluoropropylene or vinylidene fluoride with hexafluoropropylene; a terpolymer made from vinylidene fluoride and hexafluoropropylene, and also a member of the class consisting of vinyl fluoride, tetrafluoroethylene and trifluoro-ethylene.

8. Method of using at least one composite as claimed in claim 1, as a separator.

9. Method of using a composite as claimed in claim 1, where the at least one conventional separator is selected from the class consisting of a microporous polyolefin film and a polytetrafluoroethylene film, as a separator.

10. Method of using a composite as claimed in claim 1, where the solid I is selected from the class consisting of an inorganic solid, selected from the class consisting of oxides, mixed oxides, silicates, sulfates, carbonates, phosphates, nitrides, amides, imides and carbides of elements of the $1^{st}$, $2^{nd}$, $3^{rd}$ or $4^{th}$ principal group, or the $4^{th}$ transition group, of the periodic table; a polymer selected from the class consisting of polyethylene, polypropylene, polystyrene, polytetrafluoroethylene and polyvinylidene fluoride; polyamides; polyimides; and a solid dispersion comprising a polymer of this type; and a mixture of two or more of these, as a separator.

11. Method of using a composite as claimed in claim 1, where the polymer IIa has, along the chain, terminally and/or laterally, at least one reactive group RGa which is capable of hydrogen abstraction in the triplet excited state when exposed to heat and/or UV radiation, and has, along the chain, terminally and/or laterally, at least one group RGb different from RGa and coreactive with RGa, where on average across all of the polymer molecules there is at least one group RGa and at least one group RGb, where the group RGb is selected from groups which can interact with excited Norrish II photoinitiator groups, as a separator.

12. Method of using a composite as claimed in claim 1, where the polymer IIb is selected from the class consisting of a polymer or copolymer of vinyl chloride, of acrylonitrile or of vinylidene fluoride; a copolymer made from vinyl chloride and vinylidene chloride, vinyl chloride and acrylonitrile, vinylidene fluoride and hexafluoropropylene, vinylidene fluoride with hexafluoropropylene; a terpolymer made from vinylidene fluoride and hexafluoropropylene, and also a member of the class consisting of vinyl fluoride, tetrafluoroethylene and trifluoro-ethylene, as a separator.

13. Method of using at least one composite as claimed in claim 1, as a separator in an electrochemical cell.

14. Method of using a composite as claimed in claim 1 where the solid I is selected from the class consisting of an inorganic solid, selected from the class consisting of oxides, mixed oxides, silicates, sulfates, carbonates, phosphates, nitrides, amides, imides and carbides of elements of the $1^{st}$, $2^{nd}$, $3^{rd}$ or $4^{th}$ principal group, or the $4^{th}$ transition group, of the periodic table; a polymer selected from the class consisting of polyethylene, polypropylene, polystyrene, polytetrafluoroethylene and polyvinylidene fluoride; polyamides; polyimides; and a solid dispersion comprising a polymer of this type; and a mixture of two or more of these, as a separator in an electrochemical cell.

15. Method of using a composite as claimed in claim 1, where the polymer IIa has, along the chain, terminally and/or laterally, at least one reactive group RGa which is capable of hydrogen abstraction in the triplet excited state when exposed to heat and/or UV radiation, and has, along the chain, terminally and/or laterally, at least one group RGb different from RGa and coreactive with RGa, where on average across all of the polymer molecules there is at least one group RGa and at least one group RGb, where the group RGb is selected from groups which can interact with excited Norrish II photoinitiator groups, as a separator in an electrochemical cell.

16. Method of using a composite as claimed in claim 1, where the polymer IIb is selected from the class consisting of a polymer or copolymer of vinyl chloride, of acrylonitrile or of vinylidene fluoride; a copolymer made from vinyl chloride and vinylidene chloride, vinyl chloride and acrylonitrile, vinylidene fluoride and hexafluoropropylene or vinylidene fluoride with hexafluoropropylene; a terpolymer made from vinylidene fluoride and hexafluoropropylene, and also a member of the class consisting of vinyl fluoride, tetrafluoroethylene and trifluoroethylene, as a separator in an electrochemical cell.

17. A process for producing a composite, which comprises the following stages:
(I) producing at least one first layer as defined in claim 1;
(II) then combining the at least one first layer with the at least one second layer comprising the at least one conventional separator.

18. A process for producing a composite, which comprises the following stages:
(I) producing at least one first layer as defined in claim 1,
(II) then combining the at least one first layer with the at least one second layer comprising the at least one conventional separator, where at least on conventional separator is selected from the class consisting of a microporous polyolefin film and a polytetrafluoroethylene film.

19. A process for producing a composite, which comprises the following stages:
(I) producing at least one first layer as defined in claim 1;
(II) then combining the at least one first layer with the at least one second layer comprising the at least one conventional separator, where, to combine the at least one layer with the at least one second layer, comprising at least one separator, the at least one layer is applied by doctoring to the at least one conventional separator, or the at least one layer is laminated, preferably hot-laminated, to the at least one separator.

20. A process for producing a composite, which comprises the following stages:
(I) producing at least one first layer as defined in claim 1,
(II) then combining the at least one first layer with the at least one second layer comprising the at least one conventional separator, where, to combine the at least one layer with the at least one second layer, comprising at least one separator, the at least one layer is applied by doctoring to the at least one conventional separator, or the at least one layer is laminated, preferably hot-laminated, to the at least one separator and where at least one conventional separator is selected from the class consisting of a microporous polyolefin film and a polytetrafluoroethylene film.

* * * * *

UNITED STATES PATENT AND TRADEMARK OFFICE
CERTIFICATE OF CORRECTION

PATENT NO. : 6,632,561 B1 Page 1 of 1
DATED : October 14, 2003
INVENTOR(S) : Bauer et al.

It is certified that error appears in the above-identified patent and that said Letters Patent is hereby corrected as shown below:

<u>Title page, Item [54] and Column 1, line 1,</u>
Title, "COMPOSITES" should be -- COMPOSITE --.

<u>Column 34,</u>
Line 9, "claim 1" should be -- claim 3 --.
Line 25, "claim where" should be -- claim 1 where --.

Signed and Sealed this

Twenty-seventh Day of January, 2004

JON W. DUDAS
*Acting Director of the United States Patent and Trademark Office*